United States Patent
Bourouihiya

(10) Patent No.: US 10,397,622 B2
(45) Date of Patent: *Aug. 27, 2019

(54) DATA ADAPTIVE COMPRESSION AND DATA ENCRYPTION USING KRONECKER PRODUCTS

(71) Applicant: NOVA SOUTHEASTERN UNIVERSITY, Fort Lauderdale, FL (US)

(72) Inventor: Abdelkrim Bourouihiya, Fort Lauderdale, FL (US)

(73) Assignee: Nova Southeastern University, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,403

(22) Filed: Aug. 31, 2018

(65) Prior Publication Data

US 2019/0020906 A1 Jan. 17, 2019

Related U.S. Application Data

(63) Continuation of application No. 15/505,665, filed as application No. PCT/US2015/046382 on Aug. 21, 2015, now Pat. No. 10,070,158.

(Continued)

(51) Int. Cl.
*H04N 21/2347* (2011.01)
*H04N 19/46* (2014.01)
(Continued)

(52) U.S. Cl.
CPC ......... *H04N 21/2347* (2013.01); *G06F 17/16* (2013.01); *H04N 19/46* (2014.11); *H04L 9/3066* (2013.01)

(58) Field of Classification Search
CPC .. H04N 21/2347; H04N 19/46; H04L 9/3066; G06F 17/16
See application file for complete search history.

(56) References Cited

U.S. PATENT DOCUMENTS 10,070,158 B2 9/2018 Bourouihiya
2003/0200097 A1 10/2003 Brand
(Continued)

OTHER PUBLICATIONS

Abdelkrim Bourouihiya, The tensor Product of Frames, Sampling theory in signal and Image processing, vol. 7, No. 1 (2008), pp. 65-76.

(Continued)

*Primary Examiner* — Oschta I Montoya
(74) *Attorney, Agent, or Firm* — Fleit Gibbons Gutman Bongini & Bianco PL; Paul D. Bianco; Gary S. Winer

(57) ABSTRACT

Digital files are compressed using a process including Schmidt decompositions of matrices using an algorithm, termed 'BSD' herein, which is based on an algebraic method generalizing QR decomposition. Software analyzes an input file and initially identifies a matrix M, with entries within a predefined set of integers, within the file. Next, essential entries are defined, extracted from M, that contain sufficient information to recover M using BSD. The compressed file includes the essential entries and their positions within M. To achieve an encryption process, software encrypts the pattern matrix that includes the positions of the essential entries of M. To achieve a lossy compression, software identifies essential entries that contain sufficient information to recover an approximation to M for which the quality is determined by an error threshold. For a more efficient lossy compression, software uses singular value decomposition, BSD, and other signal processing of M.

2 Claims, 8 Drawing Sheets

Related U.S. Application Data

(60) Provisional application No. 62/040,674, filed on Aug. 22, 2014.

(51) Int. Cl.
  *G06F 17/16* (2006.01)
  *H04L 9/30* (2006.01)

(56) References Cited

U.S. PATENT DOCUMENTS

| | | | | |
|---|---|---|---|---|
| 2004/0190610 | A1* | 9/2004 | Song | H04N 19/159 375/240.03 |
| 2005/0031219 | A1 | 2/2005 | Puri et al. | |
| 2007/0071237 | A1* | 3/2007 | Brown | G06F 7/72 380/30 |
| 2008/0109474 | A1 | 5/2008 | Vasilescu | |
| 2010/0135398 | A1* | 6/2010 | Wittmann | H04N 19/139 375/240.16 |
| 2010/0220788 | A1* | 9/2010 | Wittmann | H04N 19/176 375/240.16 |
| 2010/0293210 | A1 | 11/2010 | Sima et al. | |
| 2011/0026607 | A1* | 2/2011 | Bhagavathy | G06T 5/002 375/240.26 |
| 2013/0016790 | A1* | 1/2013 | Jiang | H04N 19/46 375/240.25 |
| 2014/0222749 | A1 | 8/2014 | Fernandez Martinez | |
| 2015/0296214 | A1* | 10/2015 | Mahfoodh | H04N 19/44 382/233 |
| 2016/0337646 | A1* | 11/2016 | Guleryuz | H04N 19/176 |

OTHER PUBLICATIONS

H. Cheng, Z. Gimbutas, P.-G. Martinsson, V. Rokhlin, On the compression of low rank matrices, SIAM J. Sci. Comput., 26 (2005), pp. 1389-1404.

G. Eckart, G. Young, The approximation of one matrix by another of lower rank, Psychometrika, 1, 1936, pp. 211-218.

Horn, Roger A.; Johnson, Charles R., Topics in Matrix Analysis, 1991, Cambridge University Press (19 pages).

Satish K. Singh,and Shishir Kumar. Mathematical transforms and image compression: A review. Maejo Int. J. Sci. Technol. 2010, 4(02), p. 235-249.

S. O. Aase, J. H. Husoy and P. Waldemar, A critique of SVD-based image coding systems. IEEE International Symposium on Circuits and Systems on VLSI 1999, vol. 4, Orlando, Florida, USA, pp. 13-16.

B. Arnold and A. McInnes. An investigation into using singular value decomposition as a method of image compression. College of Redwood, University of Canterbury, New Zealand. Technical Report (2000) (40 pages).

H. C. Andrews and C. L. Paterson, Singular value decomposition (SVD) image coding. IEEE Trans. Comm 1976, 24, 425-432.

G. H. Golub and C. Reinsels, Singular value decomposition and least square solutions, Numer.Math., 1970, 14, 403-420. 1976, 24, 425-432.

V. Singh , Recent Patents on Image Compression—A Survey, Recent Patents on Signal Processing, 2010, p. 47-62 http://www.benthamscience.com/open/rptsp/articles/V002/47RPTSP.pdf.

Julie Kamm and James G. Nagy, kronecker product and SVD approximations in image restoration, Linear Algebra and its Applications 284, (1998) , p. 177-192.

Jain, Anil K. (1989), Fundamentals of Digital Image Processing, Prentice Hall (296 pages).

Kadison, Richard V.; Ringrose, John R. (1997), Fundamentals of the theory of operator algebras. vol. I, Graduate Studies in Mathematics 15, Providence, R.I.: American Mathematical Society (23 pages).

Steeb, Willi-Hans, Matrix Calculus and Kronecker Product with Applications and C++ Programs, 1997, World Scientific Publishing (9 pages).

Steeb, Willi-Hans, Matrix Calculus and Kronecker Product with Applications, 2011, World Scientific Publishing (46 pages).

Effat Golpar-Raboky et al, Extended integer rank reduction forumlas and Smith normal form, Linear and Multilinear Albegra, vol. 61, No. 12, p. 1641-1659.

Moody T. Chu et al, Rank-One Reduction Formula and its Applications to Matrix Factorizations, SIAM Review, vol. 37 Issue 4, Dec. 1, 1995, p. 1-22.

Dianne O'Leary et al, Digital Image Compressions by Outer Product Expansion, IEEE Transactions on Communications, vol. COM-31, No. 3, Mar. 1, 1983, p. 441-444.

Fuxiang Liu, New Kronecker product cecompositions and its applications, Intl J. of Eng and Science, vol. 1, Issue 11 Dec. 1, 2012, p. 25-30.

European Search Report for EP15833594 dated Mar. 23, 2018.

International Search Report and Written Opinion for PCT/US15/46382 filed Aug. 21, 2015.

International Preliminary Report on Patentability for PCT/US15/46382 filed Aug. 21, 2015.

* cited by examiner

DATA ADAPTIVE COMPRESSION AND DATA ENCRYPTION USING KRONECKER PRODUCTS

CROSS-REFERENCE TO RELATED APPLICATIONS

This application claims the benefit of related U.S. Patent Application No. 62/040,674, filed Aug. 22, 2014, the contents of which are incorporated herein by reference in their entirety.

FIELD OF THE DISCLOSURE

The disclosure relates to a system and method for reducing binary file size, and in particular, to file compression using matrices.

BACKGROUND OF THE DISCLOSURE

Singular Value Decomposition (SVD) yields a method to decompose each mn×pq matrix M into a sum with a minimum number of terms, each of which is the Kronecker product of an m×p matrix by and n×q matrix. This decomposition is known as a Schmidt decomposition of M. We shall say that M is decomposed with respect to the decomposition shape (m, n, p, q). Assuming that M represents a digital file, dropping some terms from the decomposition of M and using the other terms to build a matrix that approximates M leads to a lossy compression of the digital file. In addition to this compression method, there is another compression method based on SVD known as compression with SVD. Every compression method based on SVD has an energy-compaction property which causes the method to be useful for compression. With SVD, singular values and vectors are to be stored to construct the output file. These values and entries are not necessarily integers even if all entries in the original matrix are integers. Thus, storing in a computer the singular values and vectors without losing too much information requires per pixel a much larger amount of memory space than the amount of memory space occupied by a pixel in the original file. Therefore, the compression ratio with SVD is not as desirable in comparison with ratios achieved by other existing compression methods, such as JPEG [see references 4-6, below]. Other compressions schemes based on algebra include algorithms based on QR and QLP decompositions, [1A].

SUMMARY OF THE DISCLOSURE

In an embodiment of the disclosure, a method for encoding digital data comprises using a computer executing software stored on non-transitory media, the software configured to identify an mn×pq matrix M, with entries within a predefined set of integers, within the digital data; define a left essential matrix A; define a right essential matrix B; define a pattern matrix P for storing positions of essential entries; assign to matrix $M_e$ a starting value of M; define a matrix $A_e$; define a matrix $B_e$; assign a starting value to e; a) select a non-zero entry $d_e$ of $M_e$; b) store the position (r, c) of the selected non-zero entry of $M_e$ at an $e^{th}$ column of P; c) select from $M_e$ two matrices $A_e$ and $B_e$ having $d_e$ as a common entry and for which $A_e \otimes B_e/d_e$ is a term in a BSD of M with respect to the parameters m, n, p, and q; d) store in the $e^{th}$ m×p block of A the entries of M whose positions are the positions of the entries of $A_e$ in $M_e$; e) store in the $e^{th}$ n×q block of B the entries of M whose positions are the positions of the entries of $B_e$ in $M_e$; and f) calculate the matrix $M_{e+1} = M_e - A_e \otimes B_e/d_e$, and if a predetermined error threshold between M and $M_{e+1}$ is reached, repeat steps (a)-(f) with $M_{e+1}$, otherwise, P, A, and B collectively represent encoded digital data corresponding to M; and g) transfer the encoded data to digital storage on at least one of the computer executing software or another computer, the encoded data comprising fewer data bytes than the source digital data, and representing at least one of all the information in the source digital data, and an approximation of all of the information in the source digital data.

In a variation thereof, the non-zero number selected in step (a) corresponds to the first entry, with respect to the stereographic order, whose absolute value is the maximum of the absolute values of the entries of Me.

In a further variation thereof, the software is configured, in step (c), to select from $M_e$ two matrices $A_e$ and $B_e$ by i) calculating the Euclidean division of c by q and find the remainder j, and if remainder j is zero, replace j with q, then compute i=(c−j)/q+1; and ii) calculating the Euclidean division of r by n and find the remainder 1, and if remainder 1 is zero, replace 1 with n, then compute k=(r−1)/n+1.

In a yet further variation thereof, the software is further configured to (i) carry out step (d) by, for each integer a between 1 and m, and each integer b between 1 and p, storing the entry of M at position (1+(a−1)n,j+(b−1)q) in left essential matrix A at position (a, (e−1)p+b), and storing the entry of Me at position (1+(a−1)n,j+(b−1)q) in matrix Ae at position (a, b); and (ii) carry out step (e) by, for each integer a between 1 and n, and each integer b between 1 and q, storing the entry of M at position (1+(k−1)n,b+(i−1)q) in right essential matrix B at position (a, (e−1)q+b), and storing the entry of Me at position (1+(k−1)n,b+(i−1)q) in matrix Be at position (a, b).

In other variations thereof, the predetermined stop value is infinity for a lossless encoding of the digital data; the predetermined stop value is a positive number for a lossy encoding of the digital data; the sum of the stored sizes of P, A, and B is less than the stored size of the digital data corresponding to M; and/or all of the entries of A and B are extracted from M and the entries of P are integers.

In another variation thereof, the software is further configured to use P, A, and B to decode the digital data as matrix N, the software being thus further configured to define R as the number of columns in P; define E as an mn×pq matrix; define m as the number of rows in A; define p as the number of columns in A divided by R; define n as the number of rows of B; define q as the number of columns in B divided by R; assign a starting value to e; extract an ordered pair (r, c) from the $e^{th}$ column of P; carry out steps (c)-(f) in reverse, as steps (f)-(c), placing the entries of A and B in E at the same positions they occupy in M; fill with zero all values of E which have not been assigned an entry from A or B; assign to matrix $E_e$ a starting value of E; assign a starting value to e; a) extract an ordered pair (r, c) from the $e^{th}$ column of P; b) select $d_e$ the entry of $E_e$ at the position (r, c); c) using the method of steps (c)-(f) of claim 1, recover the matrices $A_e$ and $B_e$ of claim 1; and d) if e<R, compute $E_{e+1} = E_e - A_e \otimes B_e/d_e$ and repeat (a)-(d) with $E_{e+1}$, and if e=R, compute $N = A_1 \otimes B_1 + A_2 \otimes B_2 + \ldots + A_R \otimes B_R$.

In other variations thereof, in step (d), if N=M, the digital data has been decoded without a loss of data, and if N≠M, N approximates the digital data; and/or the digital data corresponding to M is encrypted by encrypting P.

In yet another variation thereof, the software is further configured to use P, A, and B to decode the digital data as a matrix that approximates M; wherein M is one of a plurality of matrices M identified within the digital data, and wherein steps (a)-(f) are performed for each of the plurality of matrices M, and wherein the digital data is encoded by the collective matrices of P, A, and B corresponding to the plurality of matrices M along with the size S of the matrix $M_E$ that represents the entire digital data.

In another embodiment of the disclosure, a method for encoding digital data, comprises using a computer executing software stored on non-transitory media, the software configured to define R as the number of columns in P; define E as an mn×pq matrix; define m as the number of rows in A; define p as the number of columns in A divided by R; define n as the number of rows of B; define q as the number of columns in B divided by R; assign a starting value to e; extract an ordered pair (r, c) from the $e^{th}$ column of P; select $d_e$ the entry of $E_e$ at the position (r, c); calculate the Euclidean division of c by q and find the remainder j, and if remainder j is zero, replace j with q, then compute i=(c−j)/q+1; calculate the Euclidean division of r by n and find the remainder l, and if remainder l is zero, replace l with n, then compute k=(r−l)/n+1; for each integer a between 1 and mn, and each integer b between 1 and pq, copy the entry of A at position (a, (e−1)p+b) into position (l+(a−1)n,j+(b−1)q) of E, and copy the entry of B at position (a, (e−1)q+b) into position (a+(k−1)n,b+(i−1)q) of E; fill with zero all values of E which have not been assigned an entry from A or B; assign to matrix $E_e$ a starting value of E; assign a starting value to e; a) extract an ordered pair (r, c) from the $e^{th}$ column of P; b) select $d_e$ the entry of $E_e$ at the position (r, c); c) calculate the Euclidean division of c by q and find the remainder j, and if remainder j is zero, replace j with q, then compute i=(c−j)/q+1; d) calculate the Euclidean division of r by n and find the remainder l, and if remainder l is zero, replace l with n, then compute k=(r−l)/n+1; e) for each integer a between 1 and m, and each integer b between 1 and p, store the entry of $E_e$ at the position (l+(a−1)n,j+(b−1)q) at the position (a, b) of matrix $A_e$; f) for each integer a between 1 and n, and each integer b between 1 and q, store the entry of $E_e$ at the position (l+(k−1)n,b+(i−1)q) at the position (a, b) of matrix $B_e$; and g) if e<R, compute $E_{e+1}=E_e-A_e\otimes B_e/d_e$ and repeat (a)-(g) with $E_{e+1}$, and if e=R, compute $N=A_1\otimes B_1+A_2\otimes B_2+\ldots+A_R\otimes B_R$; and h) transfer the encoded data to digital storage on at least one of the computer executing software or another computer, the encoded data comprising fewer data bytes than the source digital data, and representing at least one of all the information in the source digital data, and an approximation of all of the information in the source digital data.

In a variation thereof, the software is further configured to use P, A, and B to decode the digital data as a matrix that approximates M; wherein M is one of a plurality of matrices M identified within the digital data, and wherein steps (a)-(f) are performed for each of the plurality of matrices M, and wherein the digital data is encoded by the collective matrices of P, A, and B corresponding to the plurality of matrices M along with the size S of the matrix $M_E$ that represents the entire digital data.

In another variation thereof, each matrix M has a predetermined size, and wherein if the digital data is not evenly divisible by the predetermined size, a remaining partial matrix $M_p$ is padded with zeros to the predetermined size, and are discarded when the digital data is decoded.

In a further embodiment of the disclosure, a method for encoding digital data, comprises using a computer executing software stored on non-transitory media, the software configured to use SVD to find Ma, an mn×pq matrix, with the lowest Schmidt rank R for which PSNR(Ma, M)≥a predetermined value; quantize Ma to find a matrix M whose entries are integers; define a left essential matrix A; define a right essential matrix B; define a pattern matrix P for storing positions of essential entries; assign to matrix $M_e$ a starting value of M; define a matrix $A_e$; define a matrix $B_e$; assign a starting value to e; a) select a non-zero entry $d_e$ of $M_e$; b) store the position (r, c) of the selected non-zero entry of $M_e$ at an $e^{th}$ column of P; c) select from $M_e$ two matrices $A_e$ and $B_e$ having $d_e$ as a common entry and for which $A_e\otimes B_e/d_e$ is a term in the Schmidt decomposition of M with respect to the parameters m, n, p, and q; d) store in the $e^{th}$ m×p block of A the entries of M whose positions are the positions of the entries of $A_e$ in $M_e$; e) store in the $e^{th}$ n×q block of B the entries of M whose positions are the positions of the entries of $B_e$ in $M_e$; f) calculate the matrix $M_{e+1}=M_e-A_e\otimes B_e/d_e$, and if e<R, repeat steps (a)-(f) with $M_{e+1}$, and if e=R, then P, A, and B collectively represent encoded digital data corresponding to M.

In another embodiment of the disclosure, a method for encoding digital data, comprises using a computer executing software stored on non-transitory media, the software configured to: identify an mn×pq matrix M, with entries within a predefined set of integers, within the digital data; define an essential sequence S which is in two part $S_1$ and $S_2$; define an essential matrix E; define a pattern sequence PS for storing positions of n×q block matrices of E; define a matrix $A_e$; define a matrix $B_e$; assign to matrix $M_e$ a starting value of M and assign a starting value to e; a) select a non-zero entry $d_e$ of $M_e$; b) store at the $e^{th}$ term of PS the position of the $e^{th}$ n×q block of $M_e$ that includes (r, c) the position of $d_e$; c) store the $e^{th}$ n×q block matrix of M at the $e^{th}$ n×q block matrix of E, and following the lexicographic order, store the entries of the $e^{th}$ n×q block of M in $S_1$; d) calculate the Euclidean division of c by q and find the remainder j, and if the remainder is zero, replace j with q, then compute i=(c−j)/q+1; and calculate the Euclidean division of r by n and find the remainder l, and if the remainder is zero, replace l with n, then compute k=(r−l)/n+1; e) for each integer a between 1 and m and each integer b between 1 and p, store at position (a, b) of matrix $A_e$ the entry of $M_e$ at position (l+(a−1)n,j+(b−1)q), and following the lexicographic order, if position (l+(a−1)n,j+(b−1)q) of E is unfilled, store in it the entry of M located at the same position and store the same entry in sequence $S_2$; and f) calculate the matrix $M_{e+1}=M_e-A_e\otimes B_e/d_e$, and if a predetermined error threshold between M and $M_{e+1}$ is reached, repeat steps (a)-(f) with $M_{e+1}$, otherwise, collect $S_1$ and $S_2$ to form a sequence S, which with PS and the shape (m, n, p, q) represent encoded digital data corresponding to M; and g) transfer the encoded data to digital storage on at least one of the computer executing software or another computer, the encoded data comprising fewer data bytes than the source digital data, and representing at least one of all the information in the source digital data, and an approximation of all of the information in the source digital data.

In a variation thereof, the software is configured to de-encode the encoded digital data, by being further configured to: define R as the number the number of terms in PS; define E as an mn×pq matrix; use the first Rnq terms of S to build R n×q block matrices of E, use PS to identify the positions of the R block matrices, and delete from S the used terms, then call essential position any filled position of E; assign to matrix $M_e$ a starting value of E, and assign a starting value to e; a) build a matrix $B_e$ whose entries are entries of the $e^{th}$ n×q block matrix of $M_e$, and following the lexicographic order compute (r, c) the position in $M_e$ of the first entry $d_e$ in $B_e$ whose absolute value is equal to the maximum value of the absolute values of the entries of $B_e$, then store $d_e$ at the $e^{th}$ term of a sequence D; b) calculate the Euclidean division of c by q and find the remainder j, and if the remainder is zero, then replace j with q, then compute $i=(c-j)/q+1$, and calculate the Euclidean division of r by n and find the remainder l, and if the remainder is zero, replace l with n, then compute $k=(r-l)n+1$, and store i the $e^{th}$ term of a sequence I, j the $e^{th}$ term of a sequence J, k the $e^{th}$ term of a sequence K, and l the $e^{th}$ term of a sequence L; c) build an an m×p matrix $A_e$ as follows, for each (a, b), where $1 \le a \le m$ and $1 \le b \le p$, if $(l+(a-1)n, j+(b-1)q)$ is an essential position, then fill position (a, b) of $A_e$ with the entry of $M_e$ located at position $(l+(a-1)n, j+(b-1)q)$, fill this position of E with the first term of S and mark $(l+(a-1)n, j+(b-1)q)$ as an essential position of E; d) fill with zero the other positions of $A_e$; f) compute $M_{e+1}=M_e-A_e \otimes B_e/d_e$, and if e<R, then repeat steps (a)-(d) with $M_{e+1}$, and if e=R, then assign to matrix $E_e$ a starting value of E, and assign a starting value to e; g) compute i, j, k, and l that are, respectively, the $e^{th}$ term of I, the $e^{th}$ term J, the $e^{th}$ term of K, and the $e^{th}$ term of L; h) build an m×p matrix $A_e$ and an n×q matrix $B_e$ are built as follows, for each integer a between 1 and m and each integer b between 1 and p, place at position (a, b) of $A_e$ the entry of $E_e$ at position $(l+(a-1)n, j)$, and assign the $e^{th}$ n×q block matrix of $E_e$ to $B_e$; k) if e<R, then compute $E_{e+1}=E_e-A_e \otimes B_e/d_e$, where $d_e$ is the $e^{th}$ term of D, and repeat steps (g) and (h) with $E_{e+1}$, and if e=R, then compute $N=A_1 \otimes B_1/d_1 + A_2 \otimes B_2/d_2 + \ldots + A_R \otimes B_R/d_R$, wherein the matrix N is the matrix of the output file.

In a further variation thereof, lossless compression is achieved by stopping iterative computation of steps (a)-(d) in step (f) after the Schmidt rank of M is reached.

In a still further variation thereof, error is measured by using at least one of PSNR, PEVQ, and SSIM.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION OF THE DISCLOSURE

Figure 1A:
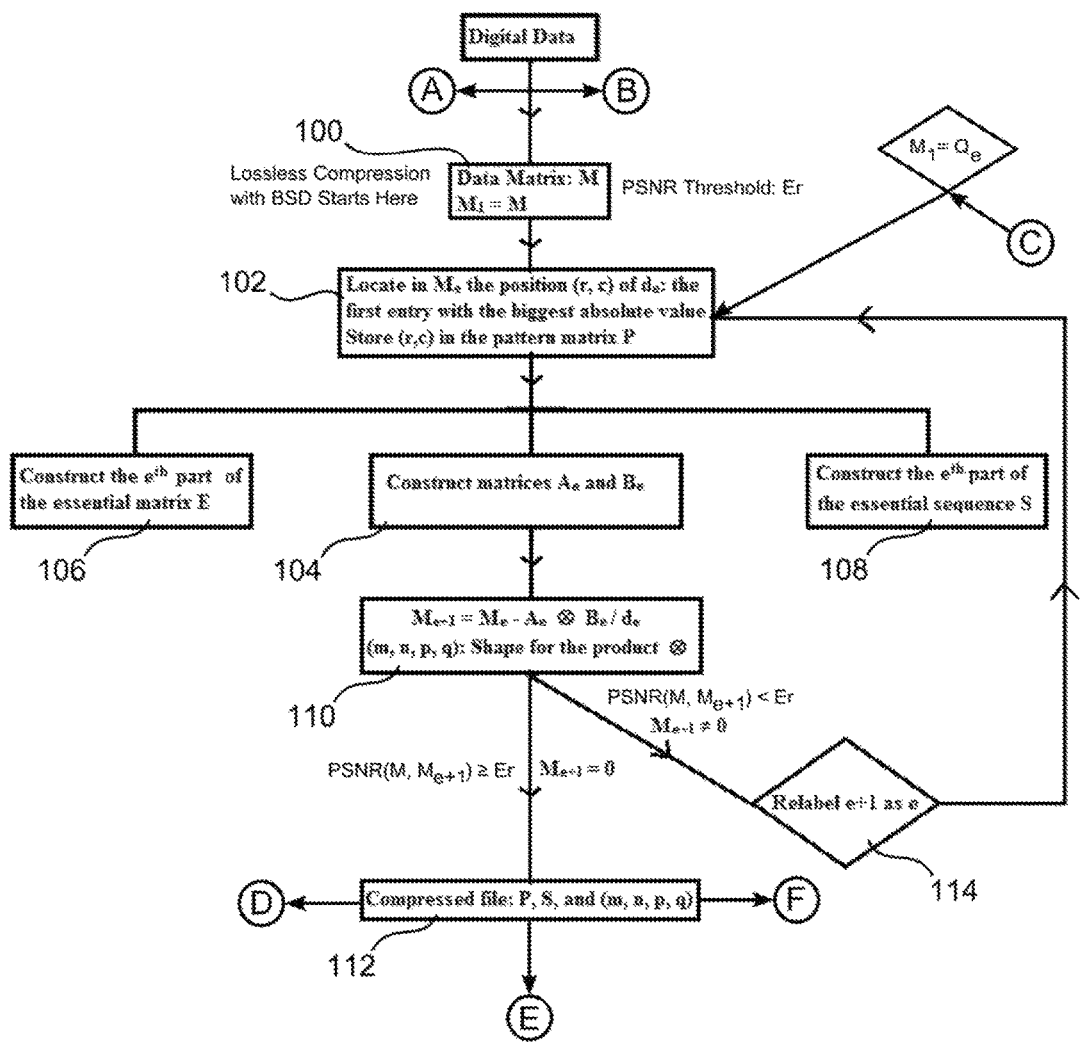
FIG. 1A is a diagram of an embodiment of BSD Lossless Compression in accordance with the disclosure, wherein the algorithms diagrammed are executed from top to bottom and left to right, and wherein letters in circles throughout the drawings refer to logical flow patterns between the various algorithms.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. Herein, reference to 'the software' refers to electronic execution of instructions embodying the methods of the disclosure, the methods of the disclosure thereby being carried out by one or more electronic processors, including, for example, parallel processors. The term 'memory value', or size in memory, may be considered to also indicate the size of the referenced element within non-volatile storage.

In an embodiment of the disclosure, digital files are compressed using a method which includes Schmidt decompositions of matrices. The disclosure provides for performing lossless and lossy compressions of any digital file that can be represented by a matrix M. The lossless compression is achieved by an apparatus that stores some entries of M to recover M. The lossy compression is achieved by an apparatus that combines methods of the disclosure with other techniques that include low rank approximation and compressing by blocks. In another aspect, an apparatus executes software configured to execute the methods of the disclosure to compresses a file, and in an embodiment, enables a user to choose a key code that is needed at the decompression process. Accordingly, the present invention enables data compression and data security.

The disclosure provides a method to find Schmidt decompositions of matrices. Herein, this method will be referred to as BSD (Bourouihiya Schmidt Decomposition). A BSD of a matrix M uses the entries of M and elementary operations to compute each entry of each matrix involved in the decomposition of M. The disclosure uses this fact to enable lossless and lossy compressions of digital files. In an embodiment, a lossless compression is almost impossible with SVD, however by combining BSD and SVD, the invention enables lossy compression while solving the storage problems encountered by compressing with SVD, and with a very low cost in term of error. Compression in accordance with the disclosure is competitive with popular existing methods, such as JPEG or JPEG2000.

The present disclosure provides the following embodiments: the use of BSD to achieve lossless or lossy compressions of digital files; the use of BSD, low rank approximation with SVD, compressing by blocks, and other techniques to achieve efficient lossy compressions of digital files, including enabling a user to choose from a multitude of parameters to adapt the compression method to a specific application; and encryption of a digital file, wherein a user can choose a key code that is required for decryption at the decompression process, wherein the encryption methods of the disclosure can be used with the lossy and lossless compressions of the disclosure.

Lossless compression of digital data or files is accomplished using BSD, as follows, although this method may also be used to achieve lossy compression:

Each mn×pq-matrix M can be written as $$M = A_1 \otimes B_1 + A_2 \otimes B_2 + \ldots + A_R \otimes B_R, \quad (4.1)$$

where $A_k$ is an m×p-matrix and $B_k$ is an n×q-matrix. In the art, Equality (4.1) is known as a Schmidt decomposition of M and R is the (Schmidt) rank if the number of terms in (4.1) is the minimum possible. We shall denote rank (M)=R. If M is decomposed using BSD, then each entry in $A_k$ or $B_k$ is computed using entries extracted from M and the elementary operations, for each k=1, . . . ,R.

Example 1

Consider the 6×6-matrix M whose entries are integers between 0 and 255. Thus, 36 Bytes is the memory space required to store M in a computer. In this example, BSD is used to decompose M with respect to (3, 2, 2, 3), i.e., into a sum of matrices, for which each term is the Kronecker product of a 3×2 matrix by a 2×3 matrix.

$$M = \begin{pmatrix} \underline{1} & 2 & 3 & 4 & 5 & 6 \\ \underline{7} & \underline{8} & 9 & 10 & 11 & \underline{12} \\ \underline{13} & 14 & 15 & \underline{16} & 17 & 18 \\ 19 & 20 & \underline{21} & 22 & 23 & \underline{24} \\ \underline{25} & 26 & 27 & \underline{28} & \underline{29} & \underline{30} \\ 31 & 32 & \underline{33} & \underline{34} & \underline{35} & \underline{36} \end{pmatrix} \quad (4.2)$$

$$M = A_1 \otimes B_1 + A_2 \otimes B_2,$$

where $$A_1 = \begin{pmatrix} 9 & 12 \\ 21 & 24 \\ 33 & 36 \end{pmatrix}$$

$$B_1 = \begin{pmatrix} 28/36 & 29/36 & 30/36 \\ 34/36 & 35/36 & 36/36 \end{pmatrix}$$

$$A_2 = \begin{pmatrix} 1 - 9(28/36) & 4 - 12(28/36) \\ 13 - 21(28/36) & 16 - 24(28/36) \\ 25 - 33(28/36) & 28 - 36(28/36) \end{pmatrix}$$

$$B_2 = \begin{pmatrix} \frac{1-9(28/36)}{1-9(28/36)} & \frac{2-9(29/36)}{1-9(28/36)} & \frac{3-9(30/36)}{1-9(28/36)} \\ \frac{7-9(34/36)}{1-9(28/36)} & \frac{8-9(35/36)}{1-9(28/36)} & \frac{9-9(36/36)}{1-9(28/36)} \end{pmatrix}$$

The entries of $A_1$, $A_2$, $B_1$, and $B_2$ are computed using the essential sequence S=(9, 12, 21, 24, 33, 36, 28, 29, 30, 34, 35, 1, 4, 13, 16, 25, 2, 3, 7, 8) whose terms are called essential entries of M (these entries are bolded and underlined in M). The methodology for selecting essential entries is provided elsewhere herein. To recover M, we need to store the decomposition shape (3, 2, 2, 3), the essential sequence S, and a pattern matrix that includes the position (6, 6) (used to locate $A_1$ and $B_1$) and the position (1, 1) (used to locate $A_2$ and $B_2$). Since there are 20 essential entries, the decomposition shape includes 4 entries, and the pattern matrix includes 4 entries, then 28 Bytes is the memory space required to store the compressed file. Thus, a lossless compression of M is achieved, from 36 Bytes to 28 Bytes. A mathematical proof for the BSD algorithm is provided elsewhere herein.

If the Schmidt decomposition of M was carried out using SVD, then $$M = N_{11} \otimes N_{21} + N_{12} \otimes N_{22},$$

where, $$N_{11} \simeq \begin{pmatrix} -13.1341 & -20.4201 \\ -42.2782 & -49.5642 \\ -71.4223 & -78.7083 \end{pmatrix}, N_{21} \simeq \begin{pmatrix} -0.3365 & -0.3535 & -0.3706 \\ -0.4389 & -0.4560 & -0.4731 \end{pmatrix},$$

$$N_{12} \simeq \begin{pmatrix} -5.9578 & -5.0018 \\ -2.1338 & -1.1778 \\ 1.6901 & 2.6461 \end{pmatrix} \text{ and } N_{22} \simeq \begin{pmatrix} 0.5739 & 0.4437 & 0.3135 \\ -0.2073 & -0.3375 & -0.4677 \end{pmatrix}.$$

Every entry in the matrix $N_{11}$, $N_{21}$, $N_{12}$, or $N_{22}$ is not an integer between 0 and 255 and can only be computed approximately. Therefore, storing these matrices does not achieve a lossless compression of M. This is because, storage of real numbers greatly increases the size of the compressed file.

Using BSD for image compression, it is unlikely that storing the compressed file requires a memory space that is more than the memory space required to store the original file. As a practical matter, most compressions are substantially smaller than the original file using the methods of the disclosure.

Embodiment 1

With reference to FIG. 1A, in an embodiment of the disclosure, lossless compression of digital files is achieved with BSD. As explained elsewhere herein, lossy compression can be achieved with a similar method.

Assume that the input file is represented by an mn×pq matrix M that will be decomposed with respect to the decomposition shape (m, n, p, q). In the course of the compression and decompression processes, we shall define and compute the following matrices and sequence.

P: The pattern matrix of M.

E: The essential matrix of M, this is an mn×pq matrix.

S: Essential sequence, built using the pigeonhole principle (it should be understood that using the pigeonhole principle is optional, as detailed elsewhere, herein).

With reference to FIG. 1A, the following sets of steps describe a BSD of M. In the following, we describe the $e^{th}$ set where e is an integer between 1 and the rank of M that will be computed during the compression process. At this set of steps, an mn×pq matrix $M_e$ is defined. At 100, the compression process starts with $M_1 = M$.

Step 1: The software computes d, the maximum value of the absolute values of the entries of $M_e$. Following the lexicographic order, position (r, c) in $M_e$ of the first entry $d_e$ whose absolute value is equal to d is stored at the $e^{th}$ column of the pattern matrix P (102).

Step 2: The software performs the Euclidean division of c by q and find the reminder j. If the reminder is zero, then j is replaced with q. The software then computes i=(c−j)/q+1.

Step 3: The software performs the Euclidean division of r by n and find the reminder l. If the reminder is zero, then l is replaced with n. The software then computes k=(r−l)/n+1.

Step 4: For each integer a between 1 and m and each integer b between 1 and p, the entry of $M_e$ at position (l+(a−1)n,j+(b−1)q) is stored at position (a, b) of the matrix $A_e$ (104). Following the lexicographic order, if position (l+(a−1)n,j+(b−1)q) of E is unfilled, we store in it the entry of M located at the same position; and we store the same entry in the sequence S (106). This entry is then called an essential entry of M.

Step 5: For each integer a between 1 and n and each integer b between 1 and q, the entry of $M_e$ at position (a+(k−1)n,b+(i−1)q) is stored at position (a, b) of the matrix $B_e$ (108). Following the lexicographic order, if position (a+(k−1)n,b+(i−1)q) of E is unfilled, we store in it the entry of M located at the same position (106); and we store the same entry in the sequence S (108). This entry is then called an essential entry of M.

Step 6: The software computes the matrix $M_{e+1}=M_e-A_e \otimes B_e/d_e$. (110) (As detailed elsewhere herein, the disclosure proves the fact that rank $(M_e-A_e \otimes B_e/d_e)$=rank$(M_e)$−1)

If $M_{e+1}=0$, then the lossless compression of M is achieved (112).

If $M_{e+1} \neq 0$, then Steps 1-6 are performed with $M_{e+1}$ (114).

The process stops after R sets of steps, where R is the Schmidt rank of M.

Figure 1B:
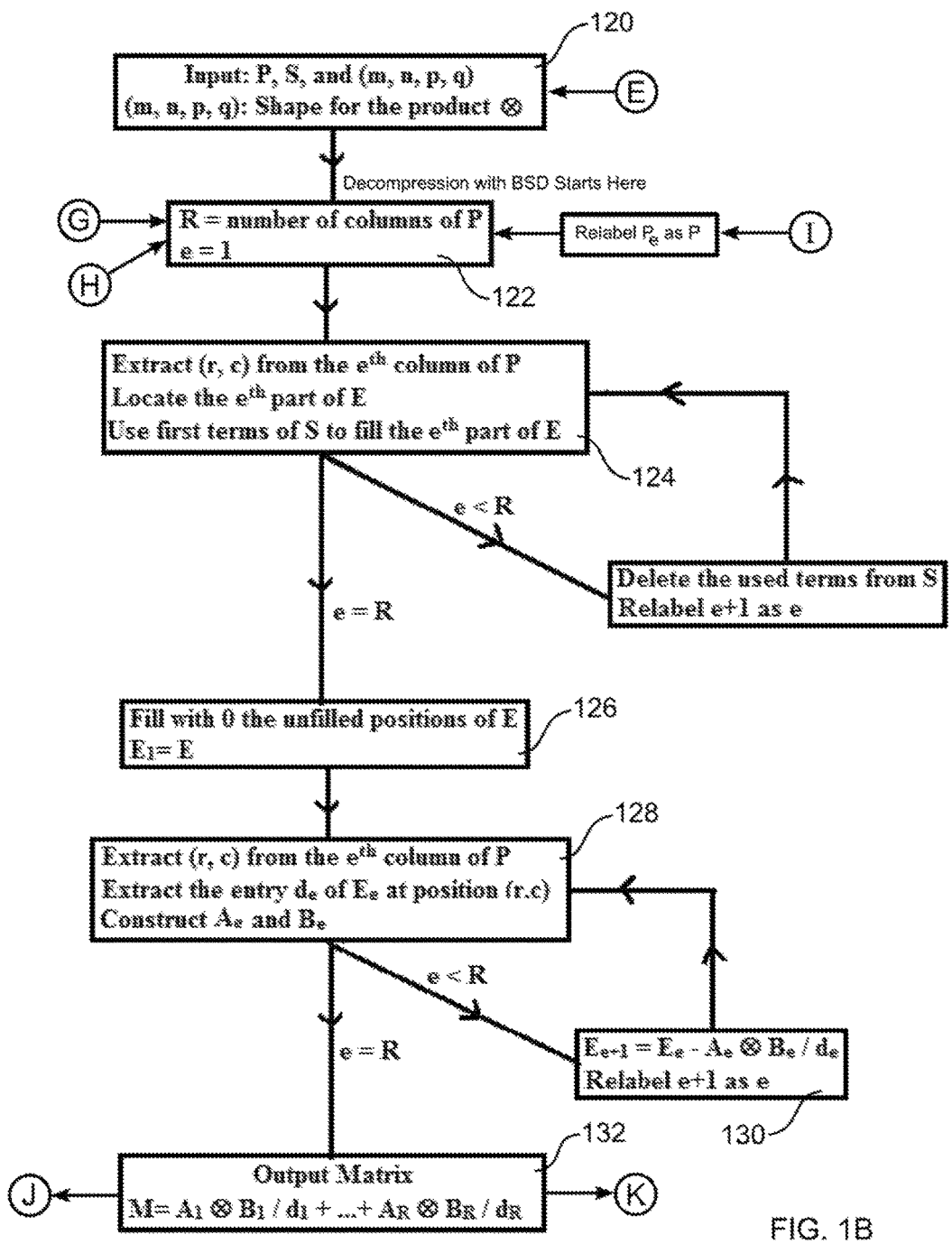
FIG. 1B is a diagram of an embodiment of BSD Lossless Decompression in accordance with the disclosure.
Figure 1C:
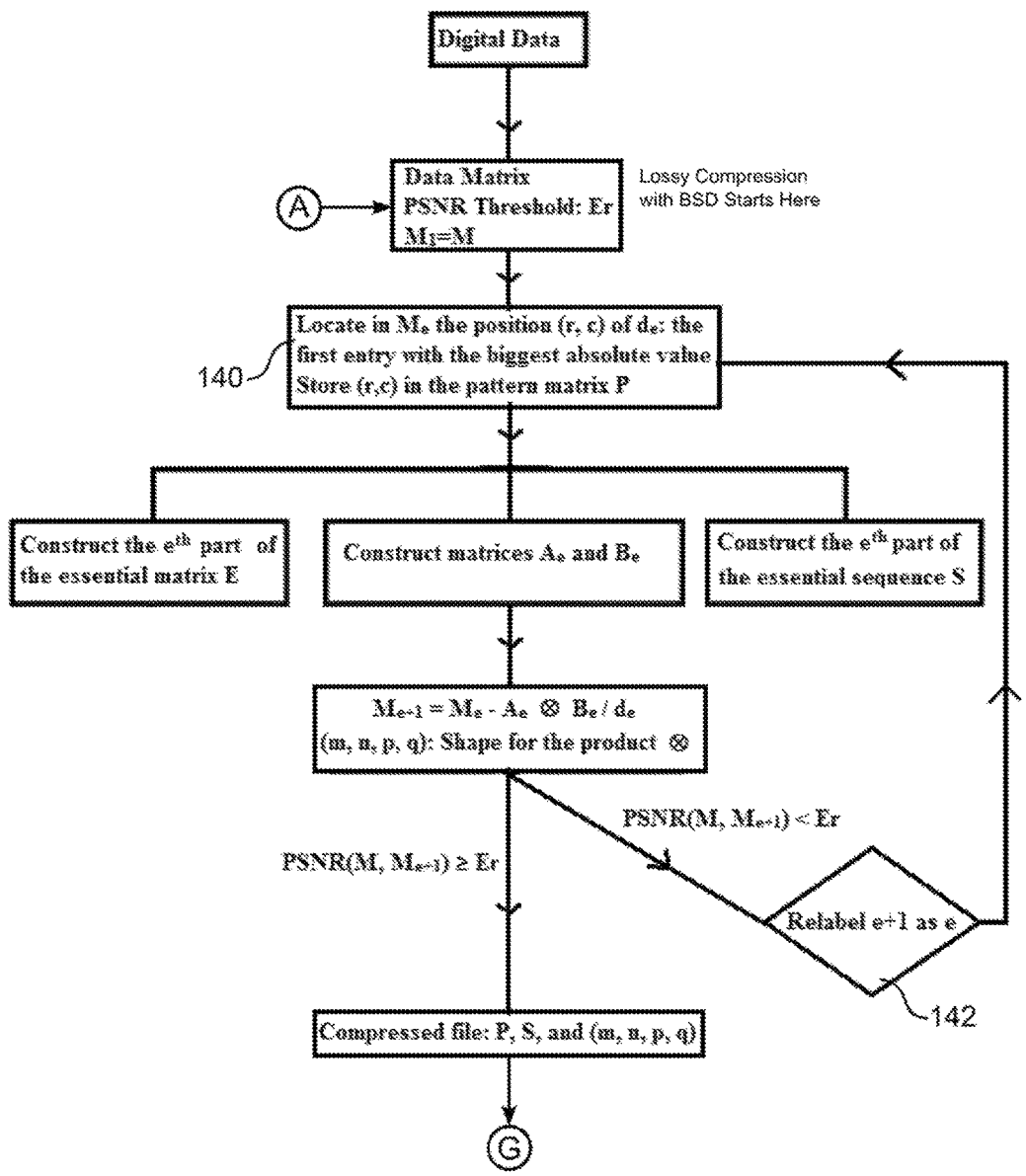
FIG. 1C is a diagram of an embodiment of BSD Lossy Compression in accordance with the disclosure.

With reference to FIG. 1C, the lossy compression process includes sets of the same steps 1-5, while an error threshold is chosen at Step 1 (140); and the second statement of Step 6 is replaced with a statement that stops the process when the error threshold is exceeded (142).

The decomposition shape (m, n, p, q), the pattern matrix P, and the essential sequence S constitute the compressed file.

There are other possible embodiments of BSD, including for example replacing step 1 with "Following the lexicographic order, position (r, c) of the first nonzero entry $d_e$ of $M_e$ is stored at the $e^{th}$ column of the pattern matrix P." Various embodiments can lead to different compression results.

The lossless compression described in this embodiment assumes that the size of the data matrix fits with the shape of the Schmidt decomposition. In other cases, the data matrix is augmented to fit the shape and the added entries are disregarded at the decompression process. Notice, that there are shapes (such as (m, n, 1, 1)) that fit with the size of every matrix.

Embodiment 1 Decompression

With reference to FIG. 1B, in the decompression process, the quadruple (m, n, p, q), the matrix P, and the sequence S constitute the input (120).

Step 1: The software computes R that is equal to the number of columns in P (122).

Step 2: Starting with e=1 and finishing with e=R, the apparatus performs the following substeps for each e (124).

Step 2.1: The apparatus extracts the ordered pair (r, c) from the $e^{th}$ column of P.

Step 2.2: The software performs the Euclidean division of c by q and find the reminder j. If the reminder is zero, then j is replaced with q. The software then computes i=(c−j)/q+1.

Step 2.3: The software performs the Euclidean division of r by n and find the reminder l. If the reminder is zero, then l is replaced with n. The software then computes k=(r−l)/n+1.

Step 2.4. Following the lexicographic order of the set {(a, b): 1≤a≤m and 1≤b≤p}, the apparatus stores the first terms of S that are enough to fill in E every unfilled position (l+(a−1)n,j+(b−1)q); S is then replaced with a new sequence that includes all terms of S but the terms used in Step 2.4 for e. After that, the old sequence is deleted and the new sequence is called S.

Step 2.5. Following the lexicographic order of the set {(a, b): 1≤a≤n and 1≤b≤q}, the apparatus stores the first terms of S that are enough to fill in E every unfilled position (a+(k−1)n,b+(i−1)q); S is then replaced with a new sequence that includes all terms of S but the terms used in Step 2.5 for e. After that, the old sequence is deleted and the new sequence is called S.

Step 3: The software fills with 0 each position in E that is not filled after step 2 (126).

Step 4: At this step, an mn×pq matrix $E_e$ is defined, for each e=1, . . . ,R. The process starts with $E_1$=E. The software extracts the ordered pair (r, c) from the $e^{th}$ column of P, extracts the entry $d_e$ of $E_e$ at position (r, c), and performs the following sub-steps (128).

Step 4.1: The software performs the Euclidean division of c by q and find the reminder j. If the reminder is zero, then j is replaced with q. The software then computes i=(c−j)/q+1.

Step 4.2: The software performs the Euclidean division of r by n and find the reminder l. If the reminder is zero, then l is replaced with n. The software then computes k=(r−l)/n+1.

Step 4.3: For each integer a between 1 and m and each integer b between 1 and p, the entry of $E_e$ at the position (l+(a−1)n,j+(b−1)q) is a is placed at position (a, b) of $A_e$.

Step 4.4: For each integer a between 1 and n and each integer b between 1 and q, the entry of $E_e$ at the position (a+(k−1)n,b+(i−1)q) is placed at position (a, b) of $B_e$.

If e<R, then the software computes $E_{e+1}=E_e-A_e \otimes B_e/d_e$ and redo sub-Steps 4.1-4.4 (130).

If e=R, then the software performs Step 5.

Step 5: The software collect the matrices found in Step 4 as follows:

$$N=A_1 \otimes B_1/d_1+A_2 \otimes B_2/d_2+ \ldots +A_R \otimes B_R/d_R.$$

The matrix N is the matrix of the output file. If the compression is lossless, then N=M (132). If the compression is lossy, then N approximates M.

Assume that a digital file is represented by M whose entries are integers between 0 and 255. Thus, every pixel in the file requires 1 byte to be stored in a computer. To store the decomposition shape we need 4 bytes. The terms of the essential sequence S are extracted from M, and hence, the memory space required to store S is less than the memory space required to store M. The number of entries of P is less than the minimum of the numbers 2mp and 2nq, while M counts mnpq entries. Practically, the pattern matrix P occupies less than 1% of the memory space occupied by M. Thus, compression with BSD has a lossless compression ratio that is more than 0.99. For example, if m=16, n=24, p=8, and q=16, the memory size of the matrix M is 49,152 bytes. Meanwhile, to store the decomposition shape (16, 24, 8, 16) and the pattern matrix P, we need no more than 260 bytes, that is less than 0.53% of the size of M. Thus, the compression ratio is more than 0.994.

In many cases, there are several choices for the decomposition shape (m, n, p, q). Some of these choices are more appropriate to adapt to some type of files to be compressed. For example, to decompose a 256×256 matrix, we can chose from 49 decomposition shapes.

The disclosure uses algebraic computations that include the Kronecker product. This can be distinguished from lossless compression methods based on statistical models and bit sequences that include Huffman coding and arithmetic coding, which are logical and statistical. The disclosure provides algebraic lossless compression that can be applied to digital data.

Embodiment 2

Figure 2A:
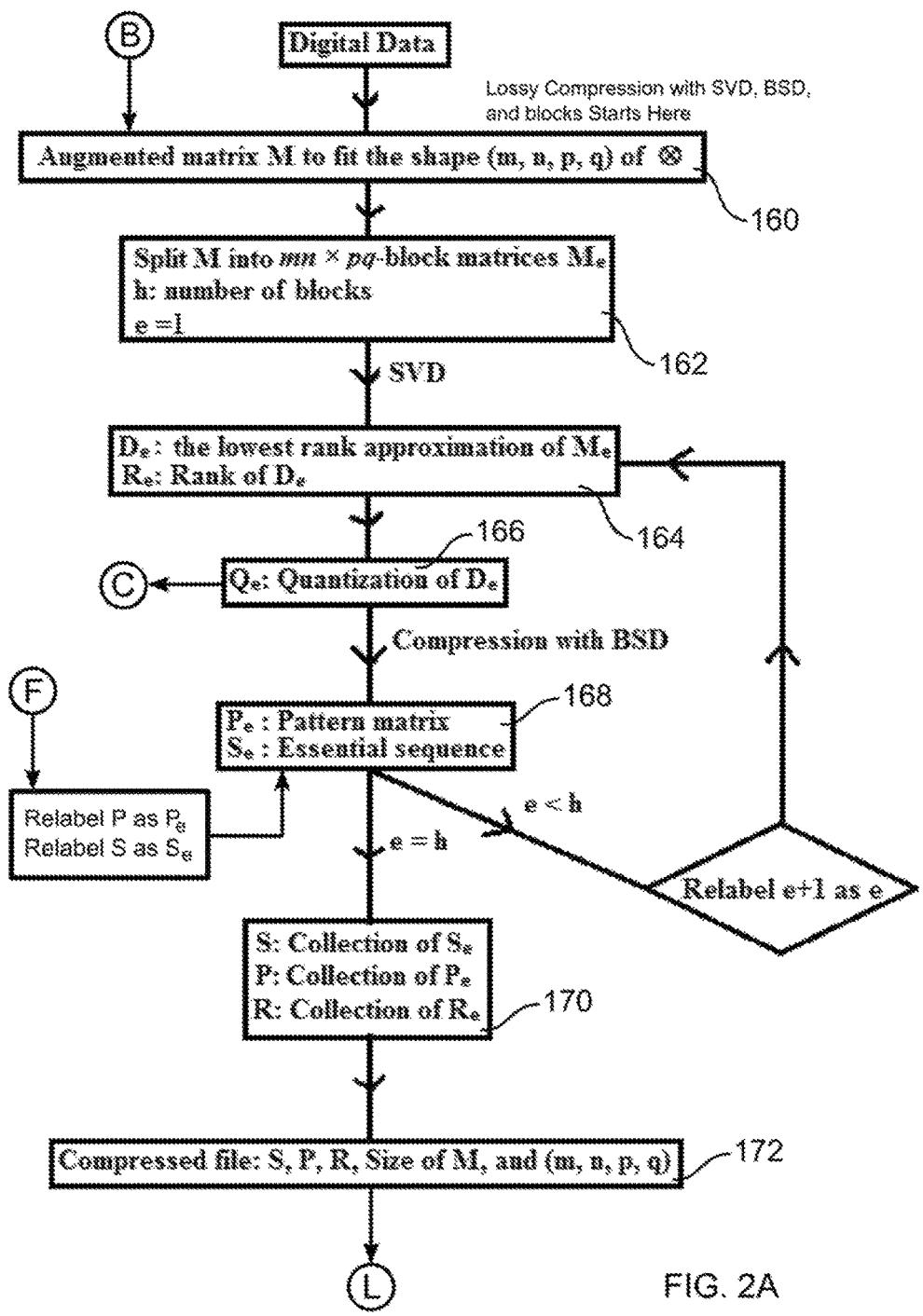
FIG. 2A is a diagram of an embodiment of BSD Lossy Compression using SVD and blocks, in accordance with the disclosure.

With reference to FIG. 2A, the second embodiment uses BSD, low rank approximation, and compressing by blocks, to achieve efficient lossy compressions of digital files. To measure the quality of the output file, Peak Signal to Noise Ratio (PSNR) is used. It should be understood that while PSNR is referenced herein as a measurement of quality or error, there are many different types of measurements of error which can be substituted, for example root means squared, PEVQ (Perceptual Evaluation of Video Quality, which is advantageous for video data), and SSIM (Structural Similarity Index Method, which, like PSNR, is advantageous for images), where the other measurement is selected as best suits the type of original data file used, or as otherwise deemed suitable for a particular purpose.

Assume that the input file is an image represented by a matrix M whose entries are integers in [0, 255], for which we want the entries of the compressed file and output file to be also integers in [0, 255]. Thus, each entry can be stored with one byte in a digital device.

For the compression process, the inputs include M, Er, a number that sets a threshold error, and the parameters m, n, p, and q that define the block matrices. We assume that the size of M is several times bigger than the size of an mn×pq-matrix. In the process of compression, M will be split into mn×pq-block matrices. In the course of the compression process the apparatus builds a pattern matrix P, an essential sequence S, and a sequence of ranks R.

Step 1: If the height of M is not divisible by mn or the width of M is not divisible by pq, then columns or rows of zeroes are added to M to reach the divisibility (160). The added parts are then disregarded at the decompressing process.

Step 2: The software splits the image into blocks. Each block is an mn×pq-matrix. Let's say that h is the number of these blocks (162). BSD will be used with respect to (m, n, p, q).

Step 3: For each e=1, . . . ,h, the software performs the following steps for the $e^{th}$ block $M_e$.

Step 3.1: Using SVD, the software computes the matrix $D_e$ that has the lowest rank possible $R_e$ among all matrices for which the PSNR with M is bigger or equal to Er (164).

Step 3.2: The software rounds up the matrix $D_e$ and obtains a matrix $Q_e$ whose entries are integers. (Most of the entries of $Q_e$ are in [0, 255], but few entries maybe out of that range) (166).

Step 3.3: Using Embodiment 1, the apparatus compresses $Q_e$ and computes the pattern matrix $P_e$ and the essential sequence $S_e$ (168).

Step 3.4: The software stores the rows of the $e^{th}$ pattern matrix in the rows (2e−1) and 2e of the pattern matrix P; the terms of $S_e$ in S (successively after the last term of S); and $R_e$ in R (170).

The quadruple (m, n, p, q), the matrix P, the sequence S, the sequence R, and the size of M constitute the compressed file (172).

Embodiment 2 Decompression

Figure 2B:
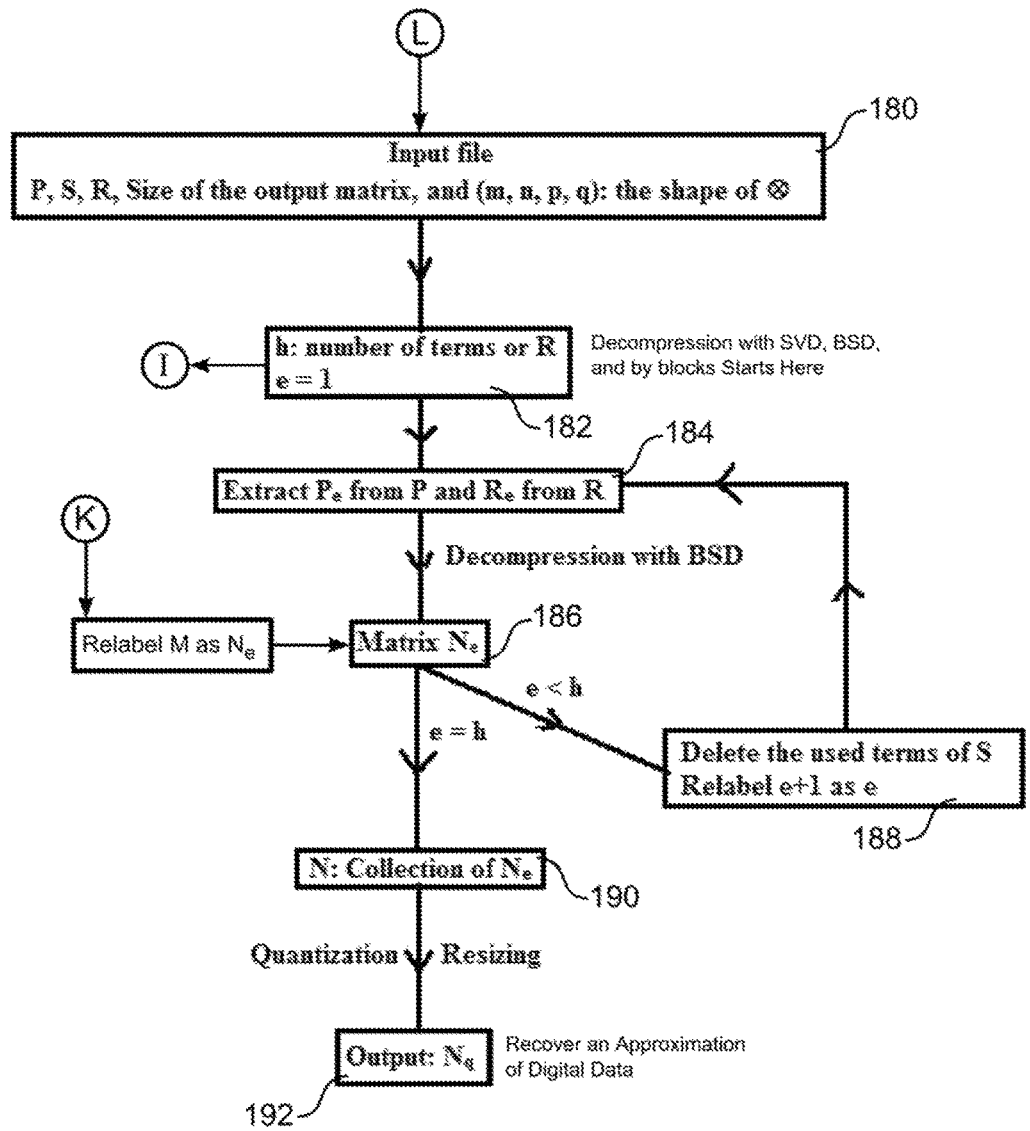
FIG. 2B is a diagram of an embodiment of BSD Decompression, where SVD and blocks were used, in accordance with the disclosure.

With reference to FIG. 2B, for the decompression process, the input is the compressed file that includes the quadruple (m, n, p, q), the matrix P, the sequence S, the sequence R, and the size of M (180).

Step 1. The software computes h as the number of terms of R (182).

Step 2. For each e=1, . . . ,h, the apparatus performs the following steps to find the $e^{th}$ block of the output matrix.

Step 2.1. The software extracts from the input matrices the matrix $P_e$ as the rows (2e−1) and 2e of the pattern matrix P and extracts from R the number $R_e$ (184).

Step 2.2. With the matrix $P_e$, the number $R_e$, and the sequence S, the apparatus uses steps 2-5 of the decompression process of embodiment 1 to build a block matrix $N_e$ that approximates the original block $M_e$ (186). The pigeonhole principle is used to replace S with a new sequence that includes all terms of S but the terms used in Step 2.2. After that the old sequence is deleted and the new sequence is called S (188).

Step 3. The software collects the h blocks built in Step 2 as one matrix N (190). The software then uses the size of M and a quantization of N to build a matrix $N_q$ whose entries are integers in [0, 255], $N_q$ has the size of M, and $N_q$ approximates M (192).

Compressing by blocks or tiling allow parallel processing that significantly reduces the compression and decompression time.

Embodiment 3

Figure 3A:
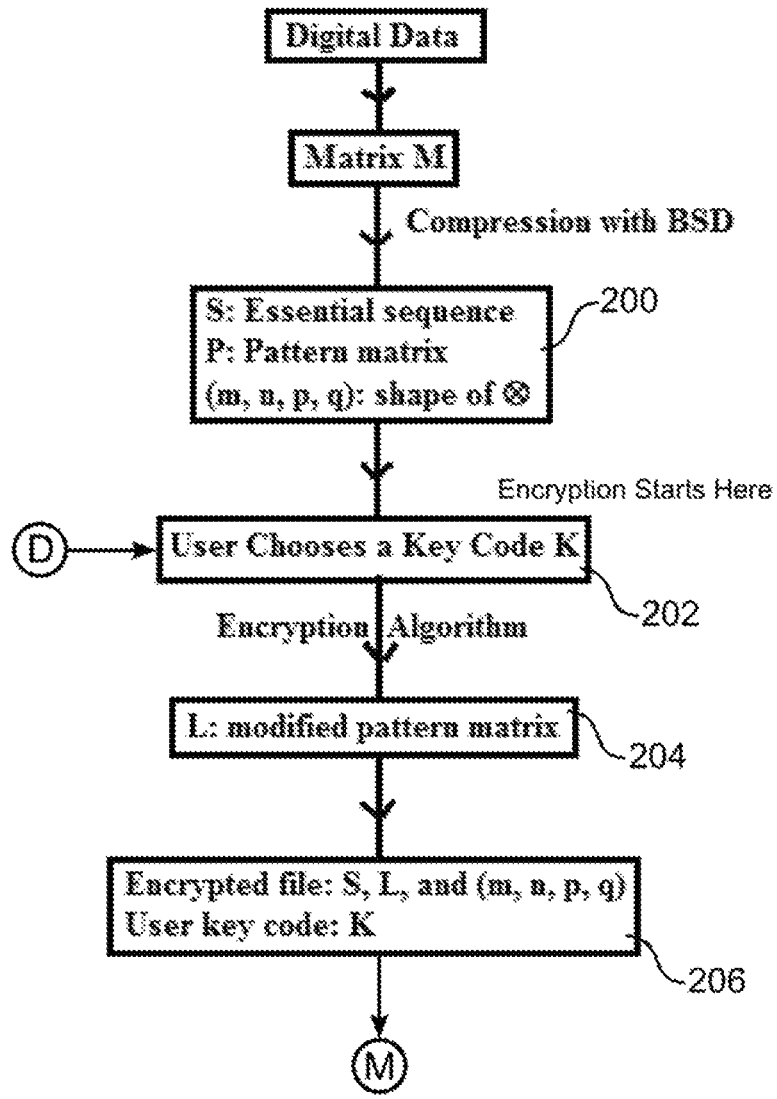
FIG. 3A is a diagram of an embodiment of BSD Compression and Encryption in accordance with the disclosure.
Figure 3B:
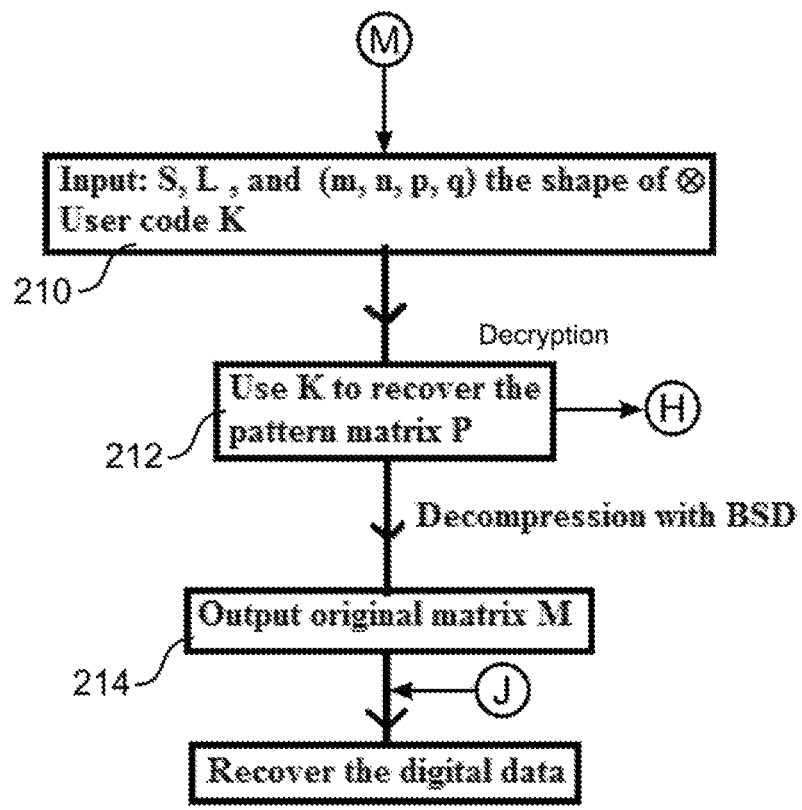
FIG. 3B is a diagram of an embodiment of BSD Decompression in accordance with the disclosure.

With reference to FIG. 3A, in a third embodiment, software of the disclosure encrypts digital files, in addition to performing compression. After compressing a file, the software enables a user to choose a key code that is needed at the decompression process. The encryption software can be used with the lossy or a lossless compression methods of the disclosure.

In an example of the encryption process, assume that the input file is represented by an mn×pq-matrix M.

Step 1. The software compresses the file using the lossless compression method described in the first embodiment. The outputs are then the essential sequence S and the pattern matrix P (200).

Step 2. The user chooses a key code K, a number that can be of one to hundreds of digits (202).

Step 3. This step can be any one-to-one algorithm implemented in the software to convert the matrix P to a matrix L, using the key code (204).

The encrypted file includes the sequence S, the matrix L, the shape (m, n, p, q), and the user key code K (206).

There are numerous possible embodiments which can be used to implement an algorithm for step 3. In an example, assume that the user chose a number $K=K_1K_2 \ldots K_h$ with h digits and h is less or equal to the number of rows of P. For each e=1, . . . ,h, the software shifts the entries of the $e^{th}$ row of P in a circular way by $K_e$ places. Other known and hereinafter developed methods can be used to convert P to L using the key code.

Embodiment 3 Decompression/Decryption

For the decryption process, the input includes S, L, K, and (m, n, p, q) (210).

Step 1. The software uses K, L, and the inverse of the algorithm of the third step in the encryption process to recover P (212).

Step 2. The software uses the lossless decompression method, described in the first embodiment, with S, P, and (m, n, p, q) to recover M (214).

The user can use an encryption apparatus executing software of the present disclosure, to secure her/his files without the involvement of a third-party. The choice by the user of the encrypting algorithm for Step 3 in the encryption process can be a part of the key code. The decomposition shape (m, n, p, q) can be also part of the key code. All these options render access of secured data by unauthorized people more difficult.

In one embodiment, for example useful within a corporate environment, software of the disclosure can be configured to generate an encrypting algorithm for each employee. An administrator manager will have access to the encrypting algorithm of each employee, while the employee can choose a key code that locks and unlocks her/his files. If one employee stops working for the company and the company wants the former employee to become unable to access the company files, the administartor has only to change the encrypting algorithm for that employee. No employee will be required to reset her/his key code.

The lossless compression method used in the first step of the encryption process can be replaced by any lossy compression method described in the first or second embodiment.

Embodiment 4

In an embodiment of the disclosure, lossless compression of digital files is achieved with BSD. As explained elsewhere herein, lossy compression can be achieved with a similar method.

Assume that the input file is represented by an mn×pq-matrix M that will be decomposed with respect to the decomposition shape (m, n, p, q). In the course of the compression and decompression processes, we shall define and compute the following matrices.

P: The pattern matrix of M, this is a 2×R-matrix.
E: The essential matrix of M, this is an mn×pq-matrix.
A: The left essential matrix of M, this is an m×Rp-matrix.
B: The right essential matrix of M, this is an n×Rq-matrix.

The following steps describe a BSD decomposition of M. In the following, we describe the $e^{th}$ set, where e is an integer between 1 and the rank of M that will be computed during the compression process. In this set of steps, an mn×pq-matrix $M_e$ is defined. The compression process starts with $M_1$=M.

Step 1: The software computes the maximum value d of the absolute values of the entries of $M_e$. Following the stereographic order, the position (r, c) of the first entry of $M_e$ that is equal to d is stored at the $e^{th}$ column of the pattern matrix P.

Step 2: The software performs the Euclidean division of c by q and find the reminder j. If the reminder is zero, then j is replaced with q. The software then computes i=(c−j)/q+1.

Step 3: The software performs the Euclidean division of r by n and find the reminder l. If the reminder is zero, then l is replaced with n. The software then computes k=(r−1)/n+1.

Step 4: For each integer a between 1 and m and each integer b between 1 and p, the entry of M at the position (1+(a−1)n,j+(b−1)q) is a left essential entry. This entry is stored at the position (a, (e−1)p+b) of the left essential matrix A. The entry of $M_e$ at the position (1+(a−1)n,j+(b−1)q) is stored at the position (a, b) of the matrix $A_e$.

Step 5: For each integer a between 1 and n and each integer b between 1 and q, the entry of M at the position (a+(k−1)n,b+(i−1)q) is a right essential entry. This entry is stored at the position (a, (e−1)q+b) of the right essential matrix B. The entry of $M_e$ at the position (a+(k−1)nb+(i−1)q) is stored at the position (a, b) of the matrix $B_e$.

Step 6: The software computes the matrix $M_{e+1}=M_e-A_e \otimes B_e$. (As detailed elsewhere herein, the disclosure proves the fact that rank $(M_e-A_e \otimes B_e)$=rank$(M_e)$−1)

If $M_{e+1}$=0, then the lossless compression of M is achieved.

If $M_{e+1} \neq 0$, then Steps 1-6 are performed with $M_{e+1}$.

The lossy compression process includes sets of the same steps 1-5, while the second statement of Step 6 is replaced with an error threshold that stops the process. P, A and B constitute the compressed file.

Embodiment 4 Decompression

In the decompression process, the matrices P, A and B constitute the input.

Step 1: The software computes R the number of columns in P, m the number of rows of A, p the number of columns of A divided by R, n the number of rows of B, and q the number of columns of B divided by R.

Step 2: For each e=1, . . . ,R, the apparatus extracts the ordered pair (r, c) from the $e^{th}$ column of P and performs the following sub-steps to fill the essential matrix E with the essential entries that are left from A and right from B.

Step 2.1: The software performs the Euclidean division of c by q and find the reminder j. If the reminder is zero, then j is replaced with q. The software then computes i=(c−j)/q+1.

Step 2.2: The software performs the Euclidean division of r by n and find the reminder l. If the reminder is zero, then l is replaced with n. The software then computes k=(r−1)/n+1.

Step 2.3: For each integer a between 1 and mn and each integer b between 1 and pq, the entry of A at the position (a, (e−1)p+b) is placed at the position (1+(a−1)n,j+(b−1)q) of E; and the entry of B at the position (a, (e−1)q+b) is placed at the position (a+(k−1)n,b+(i−1)q) of E.

Step 3: The software fills with 0 the positions in E corresponding to the positions of nonessential entries in M.

Step 4: At this step, an mn×pq-matrix $E_e$ is defined, for each e=1 . . . R. The process starts with $E_1$=E. The software extracts the ordered pair (r, c) from the $e^{th}$ column of P and performs the following sub-steps.

Step 4.1: The software performs the Euclidean division of c by q and find the reminder j. If the reminder is zero, then j is replaced with q. the software then computes i=(c−j)/q+1.

Step 4.2: The software performs the Euclidean division of r by n and find the reminder l. If the reminder is zero, then l is replaced with n. The software then computes k=(r−1)/n+1.

Step 4.3: For each integer a between 1 and m and each integer b between 1 and p, the entry of $E_e$ at the position (1+(a−1)n,j+(b−1)q) is a is placed at the position at (a, b) of the matrix $A_e$.

Step 4.4: For each integer a between 1 and n and each integer b between 1 and q, the entry of $E_e$ at the position (a+(k−1)n,b+(i−1)q) is placed at the position (a, b) of the matrix $B_e$.

If e<R, then the software computes $E_{e+1}=E_e-A_e \otimes B_e$ and redo sub-Steps 4.1-4.4.

If e=R, then the software performs Step 5.

Step 5: The software collect the matrices found in Step 4 as follows:

$$N = A_1 \otimes B_1 + A_2 \otimes B_2 + \ldots + A_R \otimes B_R.$$

The matrix N is the matrix of the output file. If the compression is lossless, then N=M. If the compression is lossy, then N approximates M.

The essential matrix E built at the decompression process can be built at the compression process and replaces the left and right essential matrices A and B. In this case, the compressed file is formed by E and P.

The entries of E are the essential entries of the original matrix M and the non-essential entries can be any number chosen. Thus, using other lossless compression on E will automatically lead to a compressed file that has a memory value less than the memory value of the compressed file if the same lossless compression method is used on M.

In practice, the pattern matrix P can occupy less than 1% of the memory space occupied by M. Thus, compression with BSD has a lossless compression ratio that is more than 0.99. For example, if m=16, n=24, p=8, and q=16, the memory size of the matrix M is 49,152 bytes. Meanwhile, to store the decomposition shape (16, 24, 8, 16) and the pattern matrix P, we need no more than 260 bytes, that is less than 0.53% of the size of M. Thus, the compression ratio is more than 0.994.

In many cases, there are several choices for the parameters m, n, p and q. Some of these choices are more appropriate to adapt to some type of files to be compressed.

Embodiment 5

The second embodiment uses BSD, low rank approximation, and compressing by blocks, to achieve efficient lossy compressions of digital files. To measure the quality of the output file, Peak Signal to Noise Ratio (PSNR) is used.

Assume that the input file is an image represented by a matrix M whose entries are integers in [0, 255], for which we want the entries of the compressed file and output file to be also integers in [0, 255].

For the compression process, the inputs include M, Er, a number that sets a threshold error, and the parameters m, n, p, and q that define the block matrices. We assume that the size of M is several times bigger than the size of an mn×pq-matrix. In the process of compression, M will be split into mn×pq-block matrices.

Step 1: If the height of M is not divisible by mn or the width of M is not divisible by pq, then columns or rows of zeroes are added to M to reach the divisibility. The added parts are then disregarded at the decompressing process.

Step 2: The software splits the image into blocks. Each block is an mn×pq-matrix. Let's say that h is the number of these blocks.

Step 3: For each e=1, . . . ,h, the software performs the following steps for the $e^{th}$ block $M_e$.

Step 3.1: Using SVD, the software computes the matrix $D_e$ that has the lowest rank possible $R_e$ among all matrices for which the PSNR with M is bigger or equal to Er.

Step 3.2: The software rounds up the matrix $D_e$ and obtains a matrix $Q_e$ whose entries are integers. (Most of the entries of $Q_e$ are in [0, 255], but few entries are out of that range).

Step 3.3: Using BSD of $M_e$ with $R_e$ sets of the steps described in 4.1.2, the software decompresses $M_e$ and, as in 4.1.2, builds the left essential, right essential, and pattern matrices of $M_e$.

Step 3.4: The software stores the rows of the $e^{th}$ pattern matrix in the rows (2e−1) and 2e of a matrix P, the pattern matrix; the rows of the $e^{th}$ left essential matrix in the rows ((e−1)m+1) to em of a matrix A, the left essential matrix; the rows of the $e^{th}$ right essential matrix in the rows ((e−1)n+1) to en of a matrix B, the right essential matrix, and $R_e$ in a sequence of numbers R. The matrices A, B, P, and R along with the size S of the original file constitute the compressed file.

Embodiment 5 Decompression

For the decompression process, the input is the compressed file that includes A, B, P, R, and S.

Step 1. The software extracts, from the input matrices, h, m, n, p, and q.

Step 2. For each e=1, . . . ,h, the apparatus performs the following steps to find the $e^{th}$ block of the output matrix.

Step 2.1. The software extracts from the input matrices, the matrices $A_e$, $B_e$, and $P_e$ and the number $R_e$.

Step 2.2. The software uses similar to the decompression process described in 4.1.4 to build a block matrix $N_e$ that approximates the block $M_e$.

Step 3. The software collects the h blocks built in Step 2 and forms a matrix, and then the software uses S to build N a matrix that approximates M. If we want the entries of the output to be an integer in [0, 255], we may need to quantize N.

Compressing by blocks or tiling allow parallel processing that significantly reduces the compression and decompression time.

Testing

Using Embodiment 5, the inventor has tested the compression and encryption methods of the disclosure. Some of those testing results are as follows.

The test images evaluated are color images in RGB format. Each image is represented by three matrices. Before compressing using BSD, a matrix was formed with the three matrices one next to the other in a horizontal orientation.

To compare the quality of the output images, Peak Signal to Noise Ratio (PSNR) is used which is commonly used to measure the quality of reconstruction of lossy compression. The larger is the value for PSNR, the better is the quality.

SVD can generally achieve a very good PSNR, albeit with the disadvantages described herein, and which are known. The tests show that BSD leads to a PSNR that is at least very close to the PSNR achieved by SVD, while the compression ratio for BSD is significantly better than the compression ratio for SVD.

The first two images "Splash" and "Lenna" are included in the set of test-images of University of South California linked at http://sipi.usc.edu/database/database.php.

The second two images "Deer" and "Spider Web" are part of the set of test-images offered at http://www.imagecompression.info/.

The third two images "kodim01" and "kodim23" are included in Kodak test-images at http://r0k.us/graphics/kodak/.

Each image is compressed using PNG, JPEG, BSD, and SVD. The trial version of PhotoPad Image Editor was used to achieve the PNG compression and the JPEG compression with its highest quality 100. The compressed files with BSD are stored in PNG format.

The output file for SVD is the file that is represented by the matrix Q in the compression process described in Embodiment 5.

The PSNRs for JPEG and BSD are almost the same. The compressed files for SVD and BSD have almost the same number of pixels, but the memory value per pixel for SVD is much larger than the memory value per pixel for BSD.

| Images Memory Value in KB | | Splash 786.432 | Lenna 786.432 | Deer 32,032.689 | Spider_Web 36,363.264 | Kodim01 1,179.648 | Kodim23 1,179.648 |
|---|---|---|---|---|---|---|---|
| Memory Value in KB | PNG | 258 | 462 | 20,200 | 9,370 | 719 | 544 |
| | JPEG | 194 | 221 | 9,550 | 4,650 | 377 | 259 |
| | BSD | 47 | 176 | 3,040 | 1,780 | 373 | 211 |
| Compression Ratio | PNG | 3.05 | 1.7 | 1.58 | 3.88 | 1.64 | 2.12 |
| | JPEG | 4.05 | 3.56 | 3.35 | 7.82 | 3.13 | 4.55 |
| | BSD | 16.72 | 4.47 | 10.53 | 20.43 | 3.16 | 5.59 |
| PSNR in dB | JPEG | 35.2605 | 37.1238 | 31.0457 | 45.7255 | 35.7935 | 42.9904 |
| | BSD | 35.4497 | 37.1894 | 31.0642 | 45.7282 | 35.8746 | 43.0094 |
| | SVD | 35.4957 | 37.3486 | 31.0935 | 46.2952 | 36.0413 | 43.5003 |

The difference between the PSNR for SVD and the PSNR for BSD is between 0.03 dB and 0.57 dB. For Splash, Deer, and Spider, the compression ratios for BSD is between 2.6 and 4 times the compression ratios for JPG. For Lenna, kodim01, and kodim23 the compression ratios are slightly improved by BSD vs JPG.

In each of the compression apparatuses of the present invention, other image processing techniques can be implemented to enhance the image quality and lead to further compression. These techniques include entropy encoding, area image compression, and YCbCr conversion.

Embodiment 6

In this embodiment of the disclosure, lossless compression of digital files is achieved using the BSD method of the disclosure. The algorithm used in this embodiment is different from the algorithm used in embodiment 1, but the two algorithms are based on BSD, as disclosed herein, and which can carry out Schmidt decompositions. As explained elsewhere herein, lossy compression can be achieved with a similar method.

Assume that the input file is represented by an mn×pq matrix M that will be compressed using a Schmidt decomposition with respect to the decomposition shape (m, n, p, q). In the course of the compression and decompression processes, we shall define and compute the following matrices and sequence.

PS: The pattern sequence of M.

E: The essential matrix of M, this is an mn×pq matrix.

S: Essential sequence, built using the pigeonhole principle. S shall have two parts $S_1$ and $S_2$.

The following sets of steps describe the compression process. We describe the $e^{th}$ set where e is an integer between 1 and the rank of M that will be computed during the compression process. At this set of steps, an mn×pq matrix $M_e$ is defined. The compression process starts with $M_1=M$.

Step 1: The software computes d, the maximum value of the absolute values of the entries of $M_e$. Following the lexicographic order, let (r, c) be the position in $M_e$ of the first entry $d_e$ whose absolute value is equal to d. Position e of the n×q block matrix of M that includes position (r, c) is stored at the $e^{th}$ term of the pattern sequence PS.

Step 2: The $e^{th}$ n×q block matrix of M is stored at the $e^{th}$ n×q block matrix of E; and following the lexicographic order, the entries of the $e^{th}$ n×q block matrix of M are stored in $S_1$.

Step 3: The software performs the Euclidean division of c by q and find the remainder j. If the remainder is zero, then j is replaced with q. The software then computes $i=(c-j)/q+1$.

Step 4: The software performs the Euclidean division of r by n and find the remainder l. If the remainder is zero, then l is replaced with n. The software then computes $k=(r-l)/n+1$.

Step 5: For each integer a between 1 and m and each integer b between 1 and p, the entry of $M_e$ at position $(l+(a-1)n, j+(b-1)q)$ is stored at position (a, b) of the matrix $A_e$. Following the lexicographic order, if position $(l+(a-1)n, j+(b-1)q)$ of E is unfilled, we store in it the entry of M located at the same position, and we store the same entry in the sequence $S_2$.

Step 6: For each integer a between 1 and n, and each integer b between 1 and q, the entry of $M_e$ at position $(a+(k-1)n, b+(i-1)q)$ is stored at position (a, b) of the matrix $B_e$.

Step 7: The software computes the matrix $M_{e+1}=M_e-A_e \otimes B_e/d_e$. (As detailed elsewhere herein, the disclosure proves the fact that rank $(M_e-A_e \otimes B_e/d_e)$=rank $(M_e)-1$)

If $M_{e+1}=0$, then the lossless compression of M is achieved.

If $M_{e+1} \neq 0$, then Steps 1-7 are performed with $M_{e+1}$.

The process stops after R sets of steps, where R is the Schmidt rank of M.

The lossy compression process includes sets of the same steps 1-6, while the second statement of Step 7 is replaced with a statement that includes an error threshold that stops the process.

The decomposition shape (m, n, p, q), the pattern sequence PS, and the essential sequence S constitute the compressed file, where S is a sequence whose first part is $S_1$ and second part is $S_2$. The essential sequence S has R(mp+nq-R) terms extracted from M and PS has R terms, while the matrix M has mpnq entries.

Embodiment 6 Decompression

In the decompression process, the quadruple (m, n, p, q), and the sequences PS and S constitute the input.

Step 1: The apparatus computes R that is equal to the number of terms in PS.

Step 2: The first Rnq terms of S are used to build R n×q block matrices of an mn×pq matrix E (the essential matrix).

The positions of the R block matrices are given by PS. The first Rnq terms of S are then deleted from S. The positions of E that are filled after Step 2 are hereafter called essential positions.

Step 3: Starting with e=1 and finishing with e=R, the apparatus performs the following sub-steps. At this step, mn×pq matrices $M_e$ are defined. The process starts with $M_1$=E.

Step 3.1: The apparatus builds the matrix $B_e$ whose entries are the entries of the $e^{th}$ n×q block matrix of $M_e$. The apparatus computes d, the maximum value of the absolute values of the entries of $B_e$. Following the lexicographic order, the apparatus computes (r, c) the position in $M_e$ of the first entry $d_e$ in $B_e$ whose absolute value is equal to d. The entry $d_e$ is stored at the $e^{th}$ term of a sequence D.

Step 3.2: The software performs the Euclidean division of c by q and finds the remainder j. If the remainder is zero, then j is replaced with q. The number j is stored at the $e^{th}$ term of a sequence J. The software then computes i=(c−j)/q+1. The number i is stored at the $e^{th}$ term of a sequence I.

Step 3.3: The software performs the Euclidean division of r by n and finds the remainder l. If the remainder is zero, then l is replaced with n. The number l is stored at the $e^{th}$ term of a sequence L. The software then computes k=(r−l)/n+1. The number k is stored at the $e^{th}$ term of a sequence K.

Step 3.4: At this sub-step an an m×p matrix $A_e$ is built. For each ordered (a, b), where 1≤a≤m and 1≤b≤p, if (l+(a−1)n, j+(b−1)q) is an essential position, then the position (a, b) of $A_e$ is filled with the entry of $M_e$ located at position (l+(a−1)n,j+(b−1)q). The other positions of $A_e$ can be filled with any value.

Step 3.5: If e=R, the apparatus performs Step 4. If not, the apparatus computes the matrix $M_{e+1}=M_e-A_e \otimes B_e/d_e$ and performs the sub-steps of Step 3 for $M_{e+1}$.

Step 4: Starting with e=1 and finishing with e=R, the apparatus computes j, the $e^{th}$ term of J and l, the $e^{th}$ term of L. Following the lexicographic order, if (l+(a−1)n,j+(b−1)q) is not an essential position of E, where 1≤a≤m and 1≤b≤p, then this position is filled with the first term of S. This term is then deleted from S and the position (l+(a−1)n,j+(b−1)q) becomes a new essential position of E.

Step 5: At this step, an mn×pq matrix $E_e$ is defined, for each e=1, . . . ,R. The process starts with $E_1$=E. Starting with e=1 and finishing with e=R, the apparatus performs the following sub-steps.

Step 5.1: The apparatus computes i, j, k, and l that are, respectively, the $e^{th}$ term of I, the $e^{th}$ term J, the $e^{th}$ term of K, and the $e^{th}$ term of L.

Step 5.2: At this sub-step, an m×p matrix $A_e$ and an n×q matrix $B_e$ are built. For each integer a between 1 and m and each integer b between 1 and p, the entry of $E_e$ at the position (l+(a−1)n,j+(b−1)q) is placed at position (a, b) of $A_e$. The entries of $B_e$ are the entries of $e^{th}$ n×q block matrix of $E_e$.

If e<R, then an electronic processing apparatus of the disclosure carrying out this method computes $E_{e+1}=E_e-A_e \otimes B_e/d_e$, where $d_e$ is the $e^{th}$ term of D, and performs sub-steps 5.1 and 5.2 for $E_{e+1}$.

If e=R, then the apparatus performs sub-step 5.3.

Step 5.3: The apparatus collects the matrices found in sub-step 5.2 as follows:

$$N=A_1 \otimes B_1/d_1+A_2 \otimes B_2/d_2+ \ldots +A_R \otimes B_R/d_R.$$

The matrix N is the matrix of the output file. If the compression is lossless, then N=M and R is the Schmidt rank of M. If the compression is lossy, then N approximates M and R is less than the Schmidt rank of M.

Additional Examples

In the following additional examples, 'the apparatus' refers to an apparatus, including a processor, executing software in accordance with the disclosure.

Consider the 6 × 6-matrix $M$ whose entries are integers between 0 and 255. Thus, the memory value of $M$ is 36 Bytes.

$$M = \begin{pmatrix} 1 & 2 & 3 & 4 & 5 & 6 \\ 7 & 8 & 9 & 10 & 11 & 12 \\ 13 & 14 & 15 & 16 & 17 & 18 \\ 19 & 20 & 21 & 22 & 23 & 24 \\ 25 & 26 & 27 & 28 & 29 & 30 \\ 31 & 32 & 33 & 34 & 35 & 36 \end{pmatrix}$$

In Section 1, I use BSD to achieve a lossless compression of $M$. We shall use BSD to decompose $M$ into a sum of matrices, for which each term is the Kronecker product of a $3 \times 2$-matrix by a $2 \times 3$-matrix. My previous summary includes a diagram that describes the lossless compression, the lossy compression, and the encrypting algorithm.

Since, rank$(M) = 2$, the lossless compression is achieved in two steps.

In section 2, I use BSD and SVD to achieve a lossy compression of $M$. I approximate $M$ with a matrix $A$ whose rank is equal to 1. Thus, the lossy compression is achieved in 1 step.

1 Lossless Compression with BSD (The first Embodiment)

1.1 Compression Process

1. The input is the matrix $M$.

Step 1.1 The entry 36 has the biggest absolute value and it is positioned at $(6,6) = (6^{th}$ row, $6^{th}$ column$)$. The position $(6,6)$ is stored in the first row of the pattern matrix $P$.

Step 1.2 The first left essential entries are chosen from $M$:

$$LE_1 = \begin{pmatrix} 9 & 12 \\ 21 & 24 \\ 33 & 36 \end{pmatrix}$$

Step 1.3 The first right essential entries are chosen from $M$:

$$RE_1 = \begin{pmatrix} 28 & 29 & 30 \\ 34 & 35 & 36 \end{pmatrix}$$

Step 1.4 The apparatus computes $$M_1 = M - LE_1 \otimes RE_1/36 =$$

$$\begin{pmatrix} 1-9\frac{28}{36} & 2-9\frac{29}{36} & 3-9\frac{30}{36} & 4-12\frac{28}{36} & 5-12\frac{29}{36} & 6-12\frac{30}{36} \\ 7-9\frac{34}{36} & 8-9\frac{35}{36} & 0 & 10-12\frac{34}{36} & 11-12\frac{35}{36} & 0 \\ 13-21\frac{28}{36} & 14-21\frac{29}{36} & 15-21\frac{30}{36} & 16-24\frac{28}{36} & 17-24\frac{29}{36} & 18-24\frac{30}{36} \\ 19-21\frac{34}{36} & 20-21\frac{35}{36} & 0 & 22-24\frac{34}{36} & 23-24\frac{35}{36} & 0 \\ 25-33\frac{28}{36} & 26-33\frac{29}{36} & 27-33\frac{30}{36} & 28-36\frac{28}{36} & 29-36\frac{29}{36} & 30-36\frac{30}{36} \\ 31-33\frac{34}{36} & 32-33\frac{35}{36} & 0 & 34-36\frac{34}{36} & 35-36\frac{35}{36} & 0 \end{pmatrix}$$

Step 2.1 The entry $(1 - 9\frac{28}{36})$ has the biggest absolute value and it is positioned at $(1,1)$ in the matrix $M_1$. The position $(1,1)$ is stored in the second row of the pattern matrix $P$.

Step 2.2 The second left essential entries are chosen from $M$:

$$LE_2 = \begin{pmatrix} 1 & 4 \\ 13 & 16 \\ 25 & 28 \end{pmatrix}$$

Step 2.3 The second right essential entries are chosen from $M$:

$$RE_2 = \begin{pmatrix} 1 & 2 & 3 \\ 7 & 8 & 9 \end{pmatrix}$$

Step 2.4 The apparatus computes $M_1 - LE_2 \otimes RE_2/(1-9\frac{28}{36})$ to find the zero-matrix. This means that $\text{rank}(M) = 2$ and the decomposition of $M$ is achieved.

2. The compressed file includes the pattern matrix $P$, the left essential matrix $LE$, and the right essential matrix $RE$:

$$P = \begin{pmatrix} 6 & 6 \\ 1 & 1 \end{pmatrix}, \quad LE = \begin{pmatrix} 9 & 12 & 1 & 4 \\ 21 & 24 & 13 & 16 \\ 33 & 36 & 25 & 28 \end{pmatrix},$$

$$\text{and } RE = \begin{pmatrix} 28 & 29 & 30 & 1 & 2 & 3 \\ 34 & 35 & 36 & 7 & 8 & 9 \end{pmatrix}$$

3. The matrices $P$, $LE$, and $RE$ have 28 entries. Thus, we compressed the memory value of $M$ from 36 bytes to 28 bytes.

4. The entries 28, 1, 36, and 9 are part of both the left and right essential entries. We then can reduce the memory value of the compressed file from 28 bytes to 24 bytes.

1.2 Decompression Process

1. The inputs are the matrices $P$, $LE$, and $RE$.

2. The number of rows of $P$ is 2. It is equal to the rank of the original matrix $M$. It is also equal to the number of steps to recover $M$.

3. The number of columns of $LE$ is 4 and the number of columns of $RE$ is 6. This means that the original matrix $M$ was decomposed into a sum of matrices, for which each term is the Kronecker product of a $3 \times 2$-matrix by a $2 \times 3$-matrix. Therefore, we can recover the matrices $LE_1$, $RE_1$, $LE_2$, and $RE_2$.

Step 1.1 Using the first row of $P$, that is $(6,6)$, the apparatus puts the entries of $LE_1$ and $RE_1$ in a matrix $E$ at the same positions they occupy in the matrix $M$.

Step 1.2 Using the second row of $P$, that is $(1,1)$, the apparatus puts the entries of $LE_2$ and $RE_2$ in the matrix $E$ at the same positions they occupy in the matrix $M$.

Step 1.3

The matrix $E$ is called the essential matrix and has the size of $M$. The entries of $E$ that are not essential entries of $M$ can be 0 or any number we want:

$$E = \begin{pmatrix} 1 & 2 & 3 & 4 & 0 & 0 \\ 7 & 8 & 9 & 0 & 0 & 12 \\ 13 & 0 & 0 & 16 & 0 & 0 \\ 0 & 0 & 21 & 0 & 0 & 24 \\ 25 & 0 & 0 & 28 & 29 & 30 \\ 0 & 0 & 33 & 34 & 35 & 36 \end{pmatrix}$$

Step 1.4 The first term in the decomposition of $M$ is $A_1 \otimes B_1$, where $A_1 = LE_1$ and $B_1 = RE_1/36$.

Step 2.1 The apparatus compute $E - A_1 \otimes B_1$:

$$E - A_1 \otimes B_1 = \begin{pmatrix} 1-9\frac{28}{36} & 2-9\frac{29}{36} & 3-9\frac{30}{36} & 4-12\frac{28}{36} & 0-12\frac{29}{36} & 0-12\frac{30}{36} \\ 7-9\frac{34}{36} & 8-9\frac{35}{36} & 0 & 0-12\frac{34}{36} & 0-12\frac{35}{36} & 0 \\ 13-21\frac{28}{36} & 0-21\frac{29}{36} & 0-21\frac{30}{36} & 16-24\frac{28}{36} & 0-24\frac{29}{36} & 0-24\frac{30}{36} \\ 0-21\frac{34}{36} & 0-21\frac{35}{36} & 0 & 0-24\frac{34}{36} & 0-24\frac{35}{36} & 0 \\ 25-33\frac{28}{36} & 0-33\frac{29}{36} & 0-33\frac{30}{36} & 28-36\frac{28}{36} & 29-36\frac{29}{36} & 30-36\frac{30}{36} \\ 0-33\frac{34}{36} & 0-33\frac{35}{36} & 0 & 34-36\frac{34}{36} & 35-36\frac{35}{36} & 0 \end{pmatrix}$$

Step 2.2 Using the position (1, 1), the second term of the decomposition of $M$ is $A_2 \otimes B_2$, where $$A_2 = \begin{pmatrix} 1-9(28/36) & 4-12(28/36) \\ 13-21(28/36) & 16-24(28/36) \\ 25-33(28/36) & 0 \end{pmatrix}$$

$$\text{and } B_2 = \begin{pmatrix} \frac{1-9(28/36)}{1-9(28/36)} & \frac{2-9(29/36)}{1-9(28/36)} & \frac{3-9(30/36)}{1-9(28/36)} \\ \frac{7-9(34/36)}{1-9(28/36)} & \frac{8-9(35/36)}{1-9(28/36)} & 0 \end{pmatrix}$$

4. Using Theorem 2.4 of the paper "Inverting the tensor product of bounded operators on Hilbert Spaces", we can prove that $$M = A_1 \otimes B_1 + A_2 \otimes B_2.$$

Thus, the matrix $M$ is recovered.

2 Lossy Compression (The second Embodiment)

2.1 Compression Process

1. The input is the matrix $M$ and $T$: a PSNR threshold to determine the quality of the output. We take $T = 44$ for this example.

Step 1.1 Using the low rank approximation theorem (EckartYoungMirsky theorem), the apparatus computes $N$ the matrix with the lowest rank among the matrices that approximate $M$ with a PSNR greater or equal to $T$. The algorithm to achieve the low rank approximation uses SVD:

$$N = \begin{pmatrix} 4.4190 & 4.6433 & 4.8677 & 6.8704 & 7.2102 & 7.5680 \\ 5.7651 & 5.9895 & 6.2138 & 8.9633 & 9.3121 & 9.6609 \\ 14.2245 & 14.9467 & 15.6689 & 16.6759 & 17.5226 & 18.3692 \\ 18.5577 & 19.2799 & 20.0021 & 21.7559 & 22.6025 & 23.4492 \\ 24.0301 & 25.2501 & 26.4702 & 26.4815 & 27.8260 & 29.1705 \\ 31.3503 & 32.5703 & 33.7904 & 34.5485 & 35.8930 & 37.2374 \end{pmatrix}$$

Step 1.2 The matrix $N$ is quantized to obtain a matrix $Q$ with integer entries:

$$Q = \begin{pmatrix} 4 & 5 & 5 & 7 & 7 & 8 \\ 6 & 6 & 6 & 10 & 9 & 10 \\ 14 & 15 & 16 & 17 & 18 & 18 \\ 19 & 19 & 20 & 22 & 23 & 23 \\ 24 & 25 & 26 & 26 & 28 & 29 \\ 31 & 33 & 34 & 35 & 36 & 37 \end{pmatrix}$$

Step 1.3 Using, with $Q$, the same steps used with $M$ for the lossless compression, we find the pattern matrix $P = (6,6)$, the left essential matrix $LE$, and the right essential matrix $RE$:

$$LE = \begin{pmatrix} 6 & 10 \\ 20 & 23 \\ 34 & 37 \end{pmatrix} \text{ and } RE = \begin{pmatrix} 26 & 28 & 29 \\ 35 & 36 & 37 \end{pmatrix}$$

2. The compressed file consists of $P$, $LE$, and $RE$. The memory value of the three matrices is 14. The compression ratio is then $36/14 \simeq 2.57$.

3. The matrix $Q$ is the output of the compression with SVD. We have PSNR($M$,$Q$)= 44.4510.

2.2 Decompression Process

The steps are similar to the steps of the lossless decompression

1. The inputs are the matrices $P$, $LE$, and $RE$.

2. The number of rows of $P$ is 1. It is equal to the rank of the matrix $N$. It is also equal to the number of steps to build the output matrix that approximates $M$.

3. The number of columns of $LE$ is 2 and the number of columns of $RE$ is 3. This means that the original matrix $M$ was decomposed into a sum of matrices, for which each term is the Kronecker product of a $3 \times 2$-matrix by a $2 \times 3$-matrix.

4. Using the first row of $P$, that is $(6,6)$, the apparatus puts the entries of $LE$ and $RE$ in a matrix $E$ at the same positions they occupy in the matrix $Q$.

5. The matrix $E$ is called the essential matrix and has the size of $M$. The entries of $E$ that are not essential entries of $M$ can be 0 or any number we want:

$$E = \begin{pmatrix} 0 & 0 & 0 & 0 & 0 & 0 \\ 0 & 0 & 6 & 0 & 0 & 10 \\ 0 & 0 & 0 & 0 & 0 & 0 \\ 0 & 0 & 20 & 0 & 0 & 23 \\ 0 & 0 & 0 & 26 & 28 & 29 \\ 0 & 0 & 33 & 35 & 36 & 37 \end{pmatrix}$$

6. Before quantization, the output is the matrix $$LE \otimes RE/37 = \begin{pmatrix} 4.2162 & 4.5405 & 4.7027 & 7.0270 & 7.5676 & 7.8378 \\ 5.6757 & 5.8378 & 6.0000 & 9.4595 & 9.7297 & 10.0000 \\ 14.0541 & 15.1351 & 15.6757 & 16.1622 & 17.4054 & 18.0270 \\ 18.9189 & 19.4595 & 20.0000 & 21.7568 & 22.3784 & 23.0000 \\ 23.8919 & 25.7297 & 26.6486 & 26.0000 & 28.0000 & 29.0000 \\ 32.1622 & 33.0811 & 34.0000 & 35.0000 & 36.0000 & 37.0000 \end{pmatrix}$$

7. After quantization, we obtain the matrix $$A = \begin{pmatrix} 4 & 5 & 5 & 7 & 8 & 8 \\ 6 & 6 & 6 & 9 & 10 & 10 \\ 14 & 15 & 16 & 16 & 17 & 18 \\ 19 & 19 & 20 & 22 & 22 & 23 \\ 24 & 26 & 27 & 26 & 28 & 29 \\ 32 & 33 & 34 & 35 & 36 & 37 \end{pmatrix}$$

8. The matrix $A$ is the output of the lossy compression of $M$. We have $PSNR(M, A) = 44.4510$.

9. For this example, $PSNR(M, A) = PSNR(M, Q)$, but, in general $PSNR(M, A)$ is little bit less than $PSNR(M, Q)$.

10. Step 5 is not necessary because the matrix $A$ was constructed in one step (this step consists of items 4-7). In general, $E$ is used if more than one steps is needed. For example, in the lossless compression of $M$, the matrix $M$ is recovered using two steps.

*Methodology and Proof*

The tensor product of bounded operators on Hilbert spaces plays an important role in mathematics and its applications. The applications include composite quantum systems in quantum mechanic, control theory, statistics, signal processing, computer computing, and elsewhere [10, 13, 14]. For the finite dimensional case, the tensor product of operators is equivalent to the Kronecker product of matrices, with which is related an important inverse problem. That is decomposing an $m_1 m_2 \times n_1 n_2$ matrix $M$ into a sum with a minimum number of terms, each of which is the Kronecker product of an $m_1 \times n_1$ matrix and an $m_2 \times n_2$ matrix. This is the so called *Schmidt decomposition* of $M$. The number of terms in this decomposition is the *Schmidt rank* of $M$ that we shall denote $rank_\otimes(M)$. The classical method to find Schmidt decompositions for matrices is using SVD. We shall call this method *SSVD*.

Assume that an $m_1 m_2 \times n_1 n_2$ matrix $M$ has an SSVD for which $rank_\otimes(M) = r$. Therefore, all matrices involved in the decomposition of $M$ have a total number of entries equals to $r(m_1 n_1 + m_2 n_2)$. Meanwhile, $M$ has $m_1 m_2 n_1 n_2$ entries. Thus, storing the matrices involved in the decomposition of $M$ achieves a lossless compression of $M$ if $r(m_1 n_1 + m_2 n_2) < m_1 m_2 n_1 n_2$. If $s < r$, Eckart-Young-Mirsky theorem uses SSVD to approximate $M$ with an $s$ Schmidt rank matrix $N$ leading to the lowest error possible when $M$ is approximated with an $s$ Schmidt rank matrix [8]. Hence, storing the matrices involved in the decomposition of $N$ achieves a lossy compression of $M$ if $s(m_1 n_1 + m_2 n_2) < m_1 m_2 n_1 n_2$. There is another compression method based on SVD known as *compression with SVD* [2, 12]. To compress with SVD, singular values and singular vectors of $M$ are to be stored.

Digital data is represented by matrices whose entries are in a certain class, i.e., a finite set of integers. However, the singular values and entries of the singular vectors are not necessarily integers for a matrix with integers entries. Therefore, a compression with SSVD or SVD leads to an output, for which each entry is more likely to be an irrational number. To store in a digital device an irrational number without significant loss of information, we need a memory space much larger than the space required to store an integer. Thus, with SSVD or SVD a lossless compressions of a digital file is almost impossible and a lossy compression leads to a compression ratio that cannot compete with ratios achieved by other existing compression methods such as JPEG.

This paper generalizes a result in [4] that provides inverse formulas for the tensor product of bounded operators on separable Hilbert spaces. These formulas are then used to develop an algorithm, with several versions, to find finite Schmidt decompositions, if any, of bounded operators on the tensor product of separable Hilbert spaces. To the best of the author's knowledge, this is the first algorithm to find Schmidt decompositions of bounded operators on the tensor product of infinite dimensional separable Hilbert spaces. For matrices, unlike with SSVD the new algorithm is practical and do not require numerical computations related to spectral decompositions. Indeed, each entry in a matrix that is part of a term in the decomposition of a matrix $M$ is computed using some entries of $M$ combined with the four elementary operations: $+, -, \times, \div$. This leads to one of the applications of the theory of this paper. That is a new lossless compression method based on SVD, with which the storage problem for digital data is solved. This is because, the new method leads to a compressed file whose entries are extracted from the original file.

In addition to compression of digital data, the theory of this paper has applications in operator theory. In particular, properties of an operator expressed with a finite Schmidt decomposition are reflected by the operators involved in the decomposition. For example, if $$F = \sum_{k=1}^{n} F_{1k} \otimes F_{2k},$$

is the decomposition of a compact operator, then the operator $F_{1k}$ is compact, for each $k \in \{1, ..., n\}$ [5].

In section 2, we collect some definitions and properties that are necessary to state our results. In section 3, we construct inverse formulas for the tensor product of bounded operators in separable Hilbert spaces, we state a Schmidt decomposition theorem for bounded operators on the tensor product of Hilbert spaces, and we describe an algorithm to find Schmidt decompositions. In section 4, we present Schmidt decomposition algorithms for matrices; and we show how lossless compressions are possible with these algorithms.

2  Preliminaries and Notations

For this paper, all Hilbert spaces are assumed to be separable. Most of the definitions and results in this section can be found in [11].

Let $\mathcal{H}$ and $\mathcal{K}$ be two Hilbert spaces. We denote by $\mathcal{B}(\mathcal{H},\mathcal{K})$ the space of bounded operators from $\mathcal{H}$ to $\mathcal{K}$. We denote by $\mathcal{L}_2(\mathcal{H},\mathcal{K})$ the space of Hilbert-Schmidt operators from $\mathcal{H}$ to $\mathcal{K}$. We denote by $\mathcal{H}'$ the dual of $\mathcal{H}$. If $x \in \mathcal{H}$, we denote by $x'$ the linear form on $\mathcal{H}$ defined by $x$, that is $$\forall y \in \mathcal{H}, \quad x'(y) = \langle y, x \rangle.$$

Notice that $(\lambda x)' = \bar{\lambda} x'$, for each complex number $\lambda$. Riesz representation theorem states that $\mathcal{H}$ and $\mathcal{H}'$ are identified by the anti-linear isometry: $x \to x'$, and so $\mathcal{H}$ and $\mathcal{H}''$ are identified by a linear isometry, where $\mathcal{H}''$ denotes the bidual of $\mathcal{H}$. We shall take the last identification as an equality. Thus, $$\forall x, y \in \mathcal{H}, \quad x(y') = y'(x) = \langle x, y \rangle.$$

For each linear mapping $F : \mathcal{H} \to \mathcal{K}$, we define $^tF : \mathcal{K}' \to \mathcal{H}'$ the transpose of $F$ as follows:

$$\forall y' \in \mathcal{K}', \quad ^tF(y') = y' \circ F.$$

For two Hilbert spaces $\mathcal{H}_1$ and $\mathcal{H}_2$, the Hilbert space $\mathcal{H}_1 \otimes \mathcal{H}_2$ can be interpreted as the Hilbert space $\mathcal{L}_2(\mathcal{H}_1', \mathcal{H}_2)$. This interpretation is based on the identification of $x_1 \otimes x_2 \in \mathcal{H}_1 \otimes \mathcal{H}_2$ with a rank one operator in the following way:

$$\forall x' \in \mathcal{H}_1', \quad x_1 \otimes x_2(x') \simeq x'(x_1)x_2 = \langle x_1, x \rangle x_2.$$

From now on, we shall take this identification as an equality.

Let $\mathcal{K}_1$ and $\mathcal{K}_2$ be two Hilbert spaces. The tensor product of two operators $F_1 \in \mathcal{B}(\mathcal{H}_1, \mathcal{K}_1)$ and $F_2 \in \mathcal{B}(\mathcal{H}_2, \mathcal{K}_2)$ can be defined as $$\forall H \in \mathcal{L}_2(\mathcal{H}_1', \mathcal{H}_2), \quad F_1 \otimes F_2(H) = F_2 H \, ^tF_1.$$

3 Schmidt Decompositions for Bounded Operators

Definition 3.1. We say that $F \in \mathcal{B}(\mathcal{H}_1 \otimes \mathcal{H}_2, \mathcal{K}_1 \otimes \mathcal{K}_2)$ has a *Schmidt rank* $r$, if $r$ is the minimum number such that $F$ can be written in the form $$F = \sum_{k=1}^{r} F_{1k} \otimes F_{2k}, \tag{3.1}$$

where $\{F_{1k}\}_{k=1}^{r} \subset \mathcal{B}(\mathcal{H}_1, \mathcal{K}_1)$ and $\{F_{2k}\}_{k=1}^{r} \subset \mathcal{B}(\mathcal{H}_2, \mathcal{K}_2)$. We denote $\text{rank}_{\otimes}(F) = r$ and we call equality (3.1) a *Schmidt decomposition* of $F$.

In the finite dimensional case, each $F \in \mathcal{B}(\mathcal{H}_1 \otimes \mathcal{H}_2, \mathcal{K}_1 \otimes \mathcal{K}_2)$ has a Schmidt rank.

The following Proposition generalizes results published by the author in [4].

Proposition 3.2. *Let $u = u_1 \otimes u_2 \in \mathcal{H}_1 \otimes \mathcal{H}_2$ and let $v = v_1 \otimes v_2 \in \mathcal{K}_1 \otimes \mathcal{K}_2$. We define the bilinear operator*

$$\begin{aligned}
\mathcal{P}_{u,v} : \mathcal{B}(\mathcal{H}_1 \otimes \mathcal{H}_2, \mathcal{K}_1 \otimes \mathcal{K}_2)^2 &\to \mathcal{B}(\mathcal{H}_1, \mathcal{K}_1) \otimes \mathcal{B}(\mathcal{H}_2, \mathcal{K}_2) \\
(F, G) &\to V^{v_2} F U^{u_2} \otimes V_{v_1} G U_{u_1},
\end{aligned}$$

*where*

$$U_{u_1} : \mathcal{H}_2 \to \mathcal{H}_1 \otimes \mathcal{H}_2, \quad \text{given by} \quad U_{u_1}(x_2) = u_1 \otimes x_2,$$
$$U^{u_2} : \mathcal{H}_1 \to \mathcal{H}_1 \otimes \mathcal{H}_2, \quad \text{given by} \quad U^{u_2}(x_1) = x_1 \otimes u_2,$$
$$V_{v_1} : \mathcal{K}_1 \otimes \mathcal{K}_2 \to \mathcal{K}_2, \quad \text{given by} \quad V_{v_1}(H) = H(v_1'), \quad \text{and}$$
$$V^{v_2} : \mathcal{K}_1 \otimes \mathcal{K}_2 \to \mathcal{K}_1, \quad \text{given by} \quad V^{v_2}(H) = {}^t H(v_2').$$

*The diagonal $\mathcal{D}_{u,v}$ of $\mathcal{P}_{u,v}$ is defined by*

$$\forall F \in \mathcal{B}(\mathcal{H}_1 \otimes \mathcal{H}_2, \mathcal{K}_1 \otimes \mathcal{K}_2), \quad \mathcal{D}_{u,v}(F) = \mathcal{P}_{u,v}(F, F).$$

*(i) For each $y_1 \otimes y_2 \in \mathcal{K}_1 \otimes \mathcal{K}_2$, we have*

$$V_{v_1}(y_1 \otimes y_2) = \langle y_1, v_1 \rangle y_2 \quad \text{and} \quad V^{v_2}(y_1 \otimes y_2) = \langle y_2, v_2 \rangle y_1.$$

*(ii) The linear operators $V_{v_1}$, $V^{v_2}$, $U_{u_1}$, and $U^{u_2}$, are bounded and we have*

$$\begin{aligned}
\|V_{v_1}\| &= \|v_1\|, \\
\|V^{v_2}\| &= \|v_2\|, \\
\forall x_1 \in \mathcal{H}_1, \quad \|U^{u_2}(x_1)\| &= \|u_2\| \|x_1\|, \\
\text{and}, \forall x_2 \in \mathcal{H}_2, \quad \|U_{u_1}(x_2)\| &= \|u_1\| \|x_2\|.
\end{aligned}$$

*(iii) The operators $\mathcal{P}_{u,v}$ is bounded and we have*

$$\|\mathcal{P}_{u,v}\| \leq \|u\| \|v\|.$$

(iv) The mapping $\mathcal{D}_{u,v}$ is continuous and we have $$\|\mathcal{D}_{u,v}(F) - \mathcal{D}_{u,v}(G)\| \le \|u\|\|v\|(\|F\| + \|G\|)\|F - G\|.$$

(v) If $\mathcal{H}_1 = \mathcal{K}_1$ and $\mathcal{H}_2 = \mathcal{K}_2$, then $$V_{v_1}U_{u_1} = <u_1, v_1> I_{\mathcal{H}_2}, \quad V^{v_2}U^{u_2} = <u_2, v_2> I_{\mathcal{H}_1},$$
$$(U_{u_1})^* = V_{u_1}, \quad and \quad (U^{u_2})^* = V^{u_2}.$$

*Proof.* Statement *(i)* is straightforward.

*(ii)* For each $H \in B(\mathcal{K}_1 \otimes \mathcal{K}_2)$, we have $$\|V_{v_1}(H)\| = \|H(v_1')\| \le \|H\|\|v_1\|,$$

and so $\|V_{v_1}\| \le \|v_1\|$.

Now, let $y_2 \in \mathcal{H}_2$ and assume $\|v_1 \otimes y_2\| = 1$. Using *(i)*, we have $$\|V_{v_1}(v_1 \otimes y_2)\| = \|(v_1, v_1)y_2\| = \|v_1\|,$$

since $\|v_1 \otimes y_2\| = \|v_1\|\|y_2\|$. Therefore, $\|V_{v_1}\| = \|v_1\|$. Similarly, we can prove that $\|V^{v_2}\| = \|v_2\|$. The other two equalities in *(ii)* are obvious.

Statement *(iii)* is an easy consequence of *(ii)*.

*(iv)* The identity $$\mathcal{D}_{u,v}(F) - \mathcal{D}_{u,v}(G) = \mathcal{P}_{u,v}(F - G, F) - \mathcal{P}_{u,v}(G, F - G)$$

and statement *(iii)* imply the inequality $$\|\mathcal{D}_{u,v}(F) - \mathcal{D}_{u,v}(G)\| \le \|u\|\|v\|(\|F\| + \|G\|)\|F - G\|,$$

and so $\mathcal{D}_{u,v}$ is continuous.

Statement *(v)* is straightforward. □

Lemma 3.3. *Let $F \in B(\mathcal{H}_1 \otimes \mathcal{H}_2, \mathcal{K}_1 \otimes \mathcal{K}_2) \setminus \{0\}$.*

*(i)* $\text{rank}_\otimes(F) = 1$ *if and only if*

$$\mathcal{D}_{u,v}(F) = <F(u), v> F$$

*for each* $(u, v) = (u_1 \otimes u_2, v_1 \otimes v_2) \in \mathcal{H}_1 \otimes \mathcal{H}_2 \times \mathcal{K}_1 \otimes \mathcal{K}_2$.

*(ii) For each $(u, v) = (u_1 \otimes u_2, v_1 \otimes v_2) \in \mathcal{H}_1 \otimes \mathcal{H}_2 \times \mathcal{K}_1 \otimes \mathcal{K}_2$, we have*

$$\mathcal{D}_{u,v}[\mathcal{D}_{u,v}(F)] = <[\mathcal{D}_{u,v}(F)](u), v> \mathcal{D}_{u,v}(F).$$

*Proof.* *(i)* Let $F = F_1 \otimes F_2 \in B(\mathcal{H}_1, \mathcal{K}_1) \otimes B(\mathcal{H}_2, \mathcal{K}_2)$, let $u = u_1 \otimes u_2 \in \mathcal{H}_1 \otimes \mathcal{H}_2$ and let $v = v_1 \otimes v_2 \in \mathcal{K}_1 \otimes \mathcal{K}_2$. Therefore, $$\forall x_1 \in \mathcal{H}_1, \quad V^{v_2}FU^{u_2}(x_1) = V^{v_2}F(x_1 \otimes u_2)$$
$$= V^{v_2}(F_1(x_1) \otimes F_2(u_2))$$
$$= (F_2(u_2), v_2)F_1(x_1).$$

Thus, $V^{u_2} F U^{u_2} = \langle F_2(u_2), v_2 \rangle F_1$. We also have $$\forall x_2 \in \mathcal{H}_2, \quad V_{v_1} F U_{u_1}(x_2) = V_{v_1} F(u_1 \otimes x_2)$$
$$= V_{v_1}(F_1(u_1) \otimes F_2(x_2))$$
$$= \langle F_1(u_1), v_1 \rangle F_2(x_2),$$

and so $V_{v_1} F U_{u_1} = \langle F_1(u_1), v_1 \rangle F_2$. Therefore, we obtain $$\mathcal{D}_{u,v}(F) = \langle F_2(u_2), v_2 \rangle F_1 \otimes \langle F_1(u_1), v_1 \rangle F_2 = \langle F(u), v \rangle F.$$

Inversely, if $F \in B(\mathcal{H}_1 \otimes \mathcal{H}_2, \mathcal{K}_1 \otimes \mathcal{K}_2) \setminus \{0\}$, then there is $(u, v) = (u_1 \otimes u_2, v_1 \otimes v_2) \in \mathcal{H}_1 \otimes \mathcal{H}_2 \times \mathcal{K}_1 \otimes \mathcal{K}_2$ for which we have $\langle F(u), v \rangle \neq 0$. Therefore, $$F = \frac{1}{\langle F(u), v \rangle} \mathcal{D}_{u,v}(F),$$

and so $\mathrm{rank}_\otimes(F) = 1$.

Statement (ii) is a straightforward consequence of statement (i). □

Remark 3.4. 1. Proposition 3.2 provides inverse formulas for the tensor product. Indeed, if $F = F_1 \otimes F_2 \in B(\mathcal{H}_1 \otimes \mathcal{H}_2, \mathcal{K}_1 \otimes \mathcal{K}_2)$ and $\langle u, F(v) \rangle = 1$ for some $(u, v) = (u_1 \otimes u_2, v_1 \otimes v_2) \in \mathcal{H}_1 \otimes \mathcal{H}_2 \times \mathcal{K}_1 \otimes \mathcal{K}_2$, then there is an $a \neq 0$ for which we have $$F_1 = a U^{u_2} F V^{v_2} \quad \text{and} \quad F_2 = \frac{1}{a} U_{u_1} F V_{v_1},$$

i.e., $F = U^{u_2} F V^{v_2} \otimes U_{u_1} F V_{v_1}$.

2. Let $(u, v) = (u_1 \otimes u_2, v_1 \otimes v_2) \in \mathcal{H}_1 \otimes \mathcal{H}_2 \times \mathcal{K}_1 \otimes \mathcal{K}_2$. The mapping $\mathcal{D}_{u,v}$ is not linear, however Lemma 3.3(ii) shows that $\mathcal{D}_{u,v}$ acts like a projection of $B(\mathcal{H}_1 \otimes \mathcal{H}_2, \mathcal{K}_1 \otimes \mathcal{K}_2)$ into $B(\mathcal{H}_1, \mathcal{K}_1) \otimes B(\mathcal{H}_2, \mathcal{K}_2)$ and we have $$\mathcal{D}_{u,v}[B(\mathcal{H}_1 \otimes \mathcal{H}_2, \mathcal{K}_1 \otimes \mathcal{K}_2)] = \{F \in B(\mathcal{H}_1, \mathcal{K}_1) \otimes B(\mathcal{H}_2, \mathcal{K}_2) : \mathrm{rank}_\otimes(F) = 1\}.$$

Definition 3.5. We say that $\{F_{1k} \otimes F_{2k}\}_{k=1}^m$ is a *finite minimal system* (FMS) in $B(\mathcal{H}_1 \otimes \mathcal{H}_1, \mathcal{K}_1 \otimes \mathcal{K}_2)$ if $\{F_{ik}\}_{k=1}^m$ is an independent system in $B(\mathcal{H}_i, \mathcal{K}_i)$, for each $i \in \{1, 2\}$.

Theorem 3.6. *Let $F \in B(\mathcal{H}_1 \otimes \mathcal{H}_2, \mathcal{K}_1 \otimes \mathcal{K}_2)$. The equality*

$$F = \sum_{k=1}^r F_{1k} \otimes F_{2k},$$

*is a Schmidt decomposition of $F$ if and only if $\{F_{1k} \otimes F_{2k}\}_{k=1}^r$ is a FMS.*

*Proof.* (i) Assume that $\{F_{1k} \otimes F_{2k}\}_{k=1}^r$ is not a FMS. We may assume without lost of generality (WLT) that $$F_{1r} = \sum_{k=1}^{r-1} c_k F_{1k},$$

where $c_1, ..., c_{r-1} \in \mathbb{C}$. Therefore, $$F = \sum_{k=1}^{r-1} F_{1k} \otimes F_{2k} + \sum_{k=1}^{r-1} c_k F_{1k} \otimes F_{2r} = \sum_{k=1}^{r-1} F_{1k} \otimes (F_{2k} + c_k F_{2r}).$$

The last sum implies $\text{rank}_{\otimes}(F) < r$.

(ii) To finish the proof of Theorem 3.6, it suffices to prove by induction on $n$ the following claim.

$C(n)$: For each FMS $\{F_{1k} \otimes F_{2k}\}_{k=1}^r$, for which $r > n$, we have $\text{rank}_{\otimes}(\{F_{1k} \otimes F_{2k}\}_{k=1}^r) > n$.

For $n = 0$, we prove a stronger statement, that is each FMS $\{F_{1k} \otimes F_{2k}\}_{k=1}^r$ is independent. For that, assume $$\sum_{k=1}^r c_k F_{1k} \otimes F_{2k} = 0.$$

where $c_1, ..., c_r \in \mathbb{C}$. Le $i \in \{1, ..., r\}$, there is a $u = u_1 \otimes u_2 \in \mathcal{H}_1 \otimes \mathcal{H}_2$ and there is a $v = v_1 \otimes v_2 \in \mathcal{K}_1 \otimes \mathcal{K}_2$, for which $\langle F_{1i} \otimes F_{2i}(u), v \rangle \neq 0$.

Using Proposition 3.2, we have $$D_{u,v}\left(\sum_{k=1}^r c_k F_{1k} \otimes F_{2k}\right) = \left(\sum_{k=1}^r c_k \langle F_{2k}(u_2), v_2 \rangle F_{1k}\right) \otimes \left(\sum_{k=1}^r \langle F_{1k}(u_1), v_1 \rangle F_{2k}\right),$$

and so $$\left(\sum_{k=1}^r c_k \langle F_{2k}(u_2), v_2 \rangle F_{1k}\right) \otimes \left(\sum_{k=1}^r \langle F_{1k}(u_1), v_1 \rangle F_{2k}\right) = 0. \tag{3.2}$$

The fact that $\langle F_{1i}(u_1), v_1 \rangle \neq 0$ implies the second component of (3.2) is not zero, and so $$\sum_{k=1}^r c_k \langle F_{2k}(u_2), v_2 \rangle F_{1k} = 0.$$

Hence, the independence of $\{F_{1k}\}_{k=1}^r$ and the fact that $\langle F_{2i}(u_2), v_2 \rangle \neq 0$ imply $c_i = 0$.

Assume that $C(n-1)$ holds for some $n > 0$. Assume that $\text{rank}_{\otimes}(\{F_{1k} \otimes F_{2k}\}_{k=1}^r) \leq n$, for some FMS $\{F_{1k} \otimes F_{2k}\}_{k=1}^r$, for which $r > n$. Therefore, $$\sum_{k=1}^r F_{1k} \otimes F_{2k} = \sum_{k=1}^n G_{1k} \otimes G_{2k},$$

where $\{G_{1k} \otimes G_{2k}\}_{k=1}^n$ is a FMS, and so $$\sum_{k=1}^{n-1} G_{1k} \otimes G_{2k} = \sum_{k=1}^r F_{1k} \otimes F_{2k} - G_{1r} \otimes G_{2r}. \tag{3.3}$$

Using $C(n-1)$, we deduce that $\{F_{11} \otimes F_{21}, \ldots, F_{1r} \otimes F_{2r}, G_{1r} \otimes G_{2r}\}$ is not a FMS. We may then assume WLG that $$G_{1r} = \sum_{k=1}^{r} c_k F_{1k},$$

where $c_1, \ldots, c_r \in \mathbb{C}$. Therefore, we can rewrite (3.3) as $$\sum_{k=1}^{n-1} G_{1k} \otimes G_{2k} = \sum_{k=1}^{r} F_{1k} \otimes (F_{2k} - c_k G_{2r}). \tag{3.4}$$

In one hand, $C(n-1)$ implies $\{F_{1k} \otimes (F_{2k} - c_k G_{2r})\}_{k=1}^{r}$ is not a FMS, and so the system $\{F_{2k} - c_k G_{2r}\}_{k=1}^{r}$ is dependent. In the other hand, the dimension of span$\{F_{2k} - c_k G_{2r}\}_{k=1}^{r} \geq r - 1$. Consequently, we may assume WLG that $$F'_{2r} = \sum_{k=1}^{r-1} a_k F'_{2k}, \tag{3.5}$$

where $a_1, \ldots, a_{r-1} \in \mathbb{C}$ and $\{F'_{2k} = F_{2k} - c_k G_{2r}\}_{k=1}^{r-1}$ is an independent system.

Using (3.4) and (3.5), we can write $$\sum_{k=1}^{n-1} G_{1k} \otimes G_{2k} = \sum_{k=1}^{r-1}(F_{1k} + a_k F_{1r}) \otimes F'_{2k}.$$

The last equality contradicts $C(n-1)$, since $\{(F_{1k} + a_k F_{2r}) \otimes F'_{2k}\}_{k=1}^{r-1}$ is a FMS. $\square$

Theorem 3.7. *Let $F \in \mathcal{B}(\mathcal{H}_1 \otimes \mathcal{H}_2, \mathcal{K}_1 \otimes \mathcal{K}_2) \setminus \{0\}$ having a finite Schmidt rank. Let $(u, v) = (u_1 \otimes u_2, v_1 \otimes v_2) \in \mathcal{H}_1 \otimes \mathcal{H}_2 \times \mathcal{K}_1 \otimes \mathcal{K}_2$. If $\langle F(u), v \rangle \neq 0$, then*

$$\text{rank}_\otimes(\langle F(u), v\rangle F - \mathcal{D}_{u,v}(F)) = \text{rank}_\otimes(F) - 1.$$

*Proof.* Assume that $\text{rank}_\otimes(F) = r$. Thus, $$F = \sum_{k=1}^{r} F_{1k} \otimes F_{2k},$$

where $\{F_{1k} \otimes F_{2k}\}_{k=1}^{r}$ is a FMS in $\mathcal{B}(\mathcal{H}_1 \otimes \mathcal{H}_2, \mathcal{K}_1 \otimes \mathcal{K}_2)$.

Because $\lambda \mathcal{D}_{u,v} = \mathcal{D}_{\lambda u, v}$, it suffices to prove that $$\text{rank}_\otimes(F - \mathcal{D}_{u,v}(F)) = \text{rank}_\otimes(F) - 1$$

whenever $\langle F(u), v \rangle = 1$.

Using Lemma 3.3, we have $$\begin{aligned}\mathcal{D}_{u,v}(F) &= \left(\sum_{k=1}^{r} a_{1k} F_{1k}\right) \otimes \left(\sum_{k=1}^{r} a_{2k} F_{2k}\right) \\ &= \sum_{k,l=1}^{r} a_{1k} a_{2l} F_{1k} \otimes F_{2l}, \end{aligned} \tag{3.6}$$

where $$\forall k = 1, \ldots, r, \quad a_{1k} = \langle F_{1k}(u_1), v_1 \rangle \quad \text{and} \quad a_{2k} = \langle F_{2k}(u_2), v_2 \rangle.$$

Therefore, equality $\langle F(u), v \rangle = 1$ implies the equality:

$$\sum_{l=1}^{r} a_{1l} a_{2l} = 1, \qquad (3.7)$$

and so $$F = \sum_{k,l=1}^{r} a_{1l} a_{2l} F_{1k} \otimes F_{2k}. \qquad (3.8)$$

Subtracting (3.6) from (3.8), we obtain $$\begin{aligned} F - \mathcal{D}_{u,v}(F) &= \sum_{k=1}^{r} F_{1k} \otimes \sum_{l=1, l \neq k}^{r} a_{1l} [a_{2l} F_{2k} - a_{2k} F_{2l}] \\ &= \sum_{k=1}^{r} \sum_{l=k+1}^{r} \Delta_{kl}^{1} \otimes \Delta_{kl}^{2} \\ &= \sum_{l=2}^{r} \Delta_{1l}^{1} \otimes \Delta_{1l}^{2} + \sum_{k=2}^{r} \sum_{l=k+1}^{r} \Delta_{kl}^{1} \otimes \Delta_{kl}^{2} \end{aligned} \qquad (3.9)$$

where, for each $k \in \{1, \ldots, r\}$ and for each $l \in \{k+1, \ldots, r\}$, $$\Delta_{kl}^{1} = a_{1l} F_{1k} - a_{1k} F_{1l} \quad \text{and} \quad \Delta_{kl}^{2} = a_{2l} F_{2k} - a_{2k} F_{2l}.$$

Owing (3.7), we may assume WLG that $a_{11} \neq 0$.
Let $k > 1$. For each $l > k$, we have $$a_{1k} \Delta_{1l}^{1} - a_{11} \Delta_{kl}^{1} = a_{1l} \Delta_{1k}^{1},$$

and so $$\Delta_{kl}^{1} = \frac{a_{1k}}{a_{11}} \Delta_{1l}^{1} - \frac{a_{1l}}{a_{11}} \Delta_{1k}^{1}. \qquad (3.10)$$

Using (3.9) and (3.10), we obtain $$\begin{aligned} F - \mathcal{D}_{u,v}(F) &= \sum_{l=2}^{r} \Delta_{1l}^{1} \otimes \Delta_{1l}^{2} - \sum_{k=2}^{r} \sum_{l=k+1}^{r} \frac{a_{1l}}{a_{11}} \Delta_{1k}^{1} \otimes \Delta_{kl}^{2} \\ &+ \sum_{k=2}^{r} \sum_{l=k+1}^{r} \frac{a_{1k}}{a_{11}} \Delta_{1l}^{1} \otimes \Delta_{kl}^{2} \end{aligned} \qquad (3.11)$$

On the right hand side of (3.11) we relabel the first double sum and we switch and relabel the last double sum to obtain $$F - \mathcal{D}_{u,v}(F) = \sum_{k=3}^{r} \Delta_{1k}^1 \otimes \Delta_{1k}^2 - \sum_{k=2}^{r} \sum_{l=k+1}^{r} \frac{a_{1l}}{a_{11}} \Delta_{1k}^1 \otimes \Delta_{kl}^2$$

$$+ \sum_{k=3}^{r} \sum_{l=2}^{k-1} \frac{a_{1l}}{a_{11}} \Delta_{1k}^1 \otimes \Delta_{lk}^2$$

$$= \sum_{k=2}^{r} \Delta_{1k}^1 \otimes \left( \Delta_{1k}^2 - \sum_{l=k+1}^{N} \frac{a_{1l}}{a_{11}} \Delta_{kl}^2 \right) + \sum_{k=3}^{r} \sum_{l=2}^{k-1} \frac{a_{1l}}{a_{11}} \Delta_{1k}^1 \otimes \Delta_{lk}^2$$

$$= \sum_{k=3}^{r} \Delta_{1k}^1 \otimes \left( \Delta_{1k}^2 - \sum_{l=k+1}^{r} \frac{a_{1l}}{a_{11}} \Delta_{kl}^2 \right)$$

$$+ \Delta_{12}^1 \otimes \left( \Delta_{12}^2 - \sum_{l=3}^{r} \frac{a_{1l}}{a_{11}} \Delta_{2l}^2 \right) + \sum_{k=3}^{r} \sum_{l=2}^{k-1} \frac{a_{1l}}{a_{11}} \Delta_{1k}^1 \otimes \Delta_{lk}^2$$

where we agree that is zero any sum whose upper bound is less than the lower bound. Consequently, we obtain $$F - \mathcal{D}_{u,v}(F) = \sum_{k=3}^{r} \Delta_{1k}^1 \otimes \left( \Delta_{1k}^2 - \sum_{l=k+1}^{r} \frac{a_{1l}}{a_{11}} \Delta_{kl}^2 + \sum_{l=2}^{k-1} \frac{a_{1l}}{a_{11}} \Delta_{lk}^2 \right)$$

$$+ \Delta_{12}^1 \otimes \left( \Delta_{12}^2 - \sum_{l=3}^{r} \frac{a_{1l}}{a_{11}} \Delta_{2l}^2 \right) \quad (3.12)$$

Using Theorem 3.6, $\text{rank}_\otimes(F - \mathcal{D}_{u,v}(F)) \geq r - 1$, while the Schmidt rank of the right hand side of (3.12) is less or equal to $r - 1$. Therefore, we obtain the desired result: $\text{rank}_\otimes(F - \mathcal{D}_{u,v}(F)) = r - 1$. □

Corollary 3.8. *Let* $F \in \mathcal{B}(\mathcal{H}_1 \otimes \mathcal{H}_2, \mathcal{K}_1 \otimes \mathcal{K}_2)$. *Let* $\mathcal{D} = \{\mathcal{D}_n\}$ *be a sequence of mappings defined on* $\mathcal{B}(\mathcal{H}_1 \otimes \mathcal{H}_2, \mathcal{K}_1 \otimes \mathcal{K}_2)$ *as follows.*

- $\mathcal{D}_0 = I$.

- *Assume that* $\mathcal{D}_0, ..., \mathcal{D}_{n-1}$ *are constructed, for some* $n > 0$.

1. *If* $\mathcal{D}_{n-1}(F) \neq 0$, *we choose* $u^n = u_1^n \otimes u_2^n \in \mathcal{H}_1 \otimes \mathcal{H}_2$ *and* $v^n = v_1^n \otimes v_2^n \in \mathcal{K}_1 \otimes \mathcal{K}_2$ *such that*

$$\langle \mathcal{D}_{n-1}(F)(u^n), v^n \rangle = 1$$

*and we let*

$$\mathcal{D}_n = (I - \mathcal{D}_{u^n, v^n})\mathcal{D}_{n-1}.$$

2. If $\mathcal{D}_{n-1}(F) = 0$, then we let $\mathcal{D}_{n-1}$ be the last term in the sequence $\mathcal{D}$.

The following statements are equivalent.

(i) $\text{rank}_\otimes(F) = r$ (ii) $\mathcal{D}_{r-1}(F) \neq 0$ and $\mathcal{D}_r(F) = 0$.

If (ii) is satisfied, then a Schmidt decomposition of $F$ is given by $$F = \sum_{n=1}^{r} [\mathcal{D}_{n-1} - \mathcal{D}_n](F) = \sum_{n=1}^{r} \mathcal{D}_{u^n, v^n} \mathcal{D}_{n-1}(F). \tag{3.13}$$

*Proof.* Theorem (3.7) states that $\text{rank}_\otimes(\mathcal{D}_1 F) = \text{rank}_\otimes(F) - 1$. An easy induction implies $$\forall n \leq \text{rank}_\otimes(F), \quad \text{rank}_\otimes(\mathcal{D}_n F) = \text{rank}_\otimes(F) - n.$$

Hence, statements (i) and (ii) are equivalent.

Notice that $$I = \sum_{n=1}^{r} [\mathcal{D}_{n-1} - \mathcal{D}_n].$$

For each $n = 1, \ldots r$, we have $\text{rank}_\otimes(\mathcal{D}_{u^n, v^n} \mathcal{D}_{n-1}(F)) \leq 1$. This with the fact that $\text{rank}_\otimes(F) = r$ implies $\text{rank}_\otimes(\mathcal{D}_{u^n, v^n} \mathcal{D}_{n-1}(F)) = 1$. Therefore, (3.13) provides a Schmidt decomposition for $F$. □

Let $F \in \mathcal{B}(\mathcal{H}_1 \otimes \mathcal{H}_2) \setminus \{0\}$. The algorithm of Corollary 3.8 can be summarized as follows.

- Chose $u^1 = u_1^1 \otimes u_2^1$ and $v^1 = v_1^1 \otimes v_2^1$ for which you have the equality $<u^1, F(v^1)> = 1$. If $F = \mathcal{D}_{u^1, v^1}(F)$, then $\text{rank}(F) = 1$ and a decomposition of $F$ is obtained. Otherwise, let $\mathcal{D}_1 F = F - \mathcal{D}_{u^1, v^1}(F)$ and go to the next step.

- Chose $u^2 = u_1^2 \otimes u_2^2$ and $v^2 = v_1^2 \otimes v_2^2$ for which you have the equality $\langle u^2, \mathcal{D}_1 F(v^2) \rangle = 1$. If $\mathcal{D}_1 F = \mathcal{D}_{u^2, v^2}(\mathcal{D}_1 F)$, then $\text{rank}_\otimes(F) = 2$ and $$F = \mathcal{D}_{u^1, v^1}(F) + \mathcal{D}_1 F$$

is a decomposition of $F$. Otherwise, let $\mathcal{D}_2 F = \mathcal{D}_1 F - \mathcal{D}_{u^2, v^2}(\mathcal{D}_1 F)$ and go to the next step.

The algorithm leads to a decomposition of $F$ after $r$ steps if and only if $\text{rank}_\otimes(F) = r$.

Corollary 3.9. *If $F \in \mathcal{B}(\mathcal{H}_1 \otimes \mathcal{H}_2) \setminus \{0\}$ has a finite Schmidt rank $r$ and*

$$F = \sum_{k=1}^{r} F_{1k} \otimes F_{2k} = \sum_{k=1}^{r} G_{1k} \otimes G_{2k},$$

*then* $\text{span}\{F_{1k} : k = 1,...,r\} = \text{span}\{G_{1k} : k = 1,...,r\}$ *and* $\text{span}\{F_{2k} : k = 1,...,r\} = \text{span}\{G_{2k} : k = 1,...,r\}$

*Proof.* We may assume WLG that the decomposition $$F = \sum_{k=1}^{r} F_{1k} \otimes F_{2k}$$

is obtained using Corollary 3.8 with the same notations. Therefore, $$F_{11} = \sum_{k=1}^{r} \langle G_{2k}(u_2^1), v_2^1 \rangle G_{1k}$$

and $$F_{21} = \sum_{k=1}^{r} \langle G_{1k}(u_1^1), v_1^1 \rangle G_{2k},$$

and so $F_{11} \in \text{span}\{G_{1k} : k = 1,...,r\}$ and $F_{21} \in \text{span}\{G_{2k} : k = 1,...,r\}$.

Assume that for each $n < r$, we have $F_{1n} \in \text{span}\{G_{1k} : k = 1,...,r\}$ and $F_{2n} \in \text{span}\{G_{2k} : k = 1,...,r\}$. Therefore, there are $H_{11},...,H_{1m} \in \text{span}\{G_{1k} : k = 1,...,r\}$ and $H_{21},...,H_{2m} \in \text{span}\{G_{2k} : k = 1,...,r\}$, for which we have $$\sum_{k=1}^{r} G_{1k} \otimes G_{2k} - \sum_{k=1}^{n} F_{1k} \otimes F_{2k} = \sum_{k=1}^{m} H_{1k} \otimes H_{2k}.$$

Hence, $$F_{1(n+1)} = \sum_{k=1}^{m} \langle H_{2k}(u_2^1), v_2^1 \rangle H_{1k}$$

and $$F_{2(n+1)} = \sum_{k=1}^{m} \langle H_{1k}(u_1^1), v_1^1 \rangle H_{2k},$$

and so $F_{1(n+1)} \in \text{span}\{H_{1k} : k = 1,...,m\}$ and $F_{2(n+1)} \in \text{span}\{H_{2k} : k = 1,...,m\}$. Consequently, $F_{1(n+1)} \in \text{span}\{G_{1k} : k = 1,...,r\}$ and $F_{2(n+1)} \in \text{span}\{G_{2k} : k = 1,...,r\}$.

We conclude, for each $i \in \{1,2\}$, $\text{span}\{F_{ik} : k = 1,...,r\}$ is a vector subspace of $\text{span}\{G_{ik} : k = 1,...,r\}$. Since, by Theorem 3.6, the two vector spaces have the same dimension $r$, we have $\text{span}\{F_{ik} : k = 1,...,r\} = \text{span}\{G_{ik} : k = 1,...,r\}$.

□

4 Schmidt Decompositions for Matrices

4.1 BSD Algorithms

In this section, $\mathcal{H}_m$ or $\mathcal{K}_m$ is the Hilbert space $\mathbb{C}^m$ endowed with the canonical basis $\{e_i = (\delta_{i1}, ..., \delta_{im})\}_{i=1}^m$, where $\delta_{ij}$ is the Dirac symbol. Every $n \times m$ matrix $M$ represents an operator: $\mathcal{H}_m \to \mathcal{H}_n$. We shall use the same symbol to denote an operator and its matrix.

We shall mean by a Schmidt decompositions of a matrix $M$ with respect to $(n_1, n_2, m_1, m_2)$ a Schmidt decompositions of an $n_1 n_2 \times m_1 m_2$ matrix $M$, for which each term is the Kronecker product of an $n_1 \times m_1$ matrix by an $n_2 \times m_2$ matrix. This is equivalent to a Schmidt decomposition of the operator $M: \mathcal{H}_{m_1} \otimes \mathcal{H}_{m_2} \to \mathcal{K}_{n_1} \otimes \mathcal{K}_{n_2}$, for which each term is the tensor product of an operator $\mathcal{H}_{m_1} \to \mathcal{K}_{n_1}$ and an operator $\mathcal{H}_{m_2} \to \mathcal{K}_{n_2}$, where each Hilbert space is endowed with its canonical basis.

Hereafter, we shall use the following notations. For each $h \in \{1, 2\}$, the canonical bases of $\mathcal{H}_{m_h}$ and $\mathcal{K}_{n_h}$ are, respectively, denoted $\{e_{hi}\}_{i=1}^{m_h}$ and $\{f_{hi}\}_{i=1}^{n_h}$. The the canonical bases of $\mathcal{H}_{m_1} \otimes \mathcal{H}_{m_2}$ and $\mathcal{K}_{n_1} \otimes \mathcal{K}_{n_2}$ are, respectively, denoted $\{e_\alpha\}_{\alpha=1}^{m_1 m_2}$ and $\{f_\beta\}_{\beta=1}^{n_1 n_2}$.

Hereafter, when we say an entry of a matrix $M$, we mean the entry as it is positioned in $M$. Thus, two different entries of $M$ may have the same numerical value.

There is a unique SSVD of $M$ with respect to $(n_1, n_2, m_1, m_2)$. Meanwhile, Corollary 3.8 yields infinitely many algorithms to find Schmidt decompositions of $M$. We shall call BSD any Schmidt decomposition based on Corollary 3.8. In the following, we shall describe in details what we shall call a *canonical BSD algorithm*.

Lemma 4.1. *Fix $i \in \{1, ..., m_1\}$, $j \in \{1, ..., m_2\}$, $k \in \{1, ..., n_1\}$, and $l \in \{1, ..., n_2\}$. With the notations of Proposition 3.2, we have the followings.*

(i) *All entries of the matrix $U_{e_{1i}}$ take the value zero except the entries of the diagonal of the block $\{(s, t) : (i-1)m_2 + 1 \leq s \leq im_2 \text{ and } 1 \leq t \leq m_2\}$, for which each entry takes the value 1.*

(ii) *All entries of the matrix $V_{f_{1k}}$ take the value zero except the entries of the diagonal of the block $\{(s, t) : (k-1)n_2 + 1 \leq s \leq kn_2 \text{ and } 1 \leq t \leq n_2\}$, for which each takes the value 1.*

(iii) *All entries of the matrix $U^{e_{2j}}$ take the value zero except the entries at $((s-1)m_2 + j, s)$ for $1 \leq s \leq m_1$, each of which takes the value 1.*

(iv) *All entries of the matrix $U^{f_{2l}}$ take the value zero except the entries at $((s-1)n_2 + l, s)$ for $1 \leq s \leq m_1$, each of which takes the value 1.*

*Proof.* (i) The canonical basis $\{e_\alpha\}_{\alpha=1}^{m_1 m_2}$ of $\mathcal{H}_{m_1} \otimes \mathcal{H}_{m_2}$ is the tensor product of the basis $\{e_{1i}\}_{i=1}^{m_1}$ and $\{e_{2i}\}_{i=1}^{m_2}$ ordered stereographically. Therefore, for each $\alpha \in \{1, ..., m_1 m_2\}$ there is a unique ordered pair $(s, t) \in \{1, ..., m_1\} \times \{1, ..., m_2\}$ such that $$\alpha = (s-1)m_2 + t \quad \text{and} \quad e_\alpha = e_{1s} \otimes e_{2t}. \tag{4.1}$$

Thus, $(s-1)$ is the quotient in the Euclidean division of $\alpha$ by $m_2$, while $t = r$ if $r > 0$ and $t = m_2$ if $r = 0$, where $r$ is the reminder in the Euclidean division. For each $t \in \{1, ..., m_2\}$, we have $$U_{e_{1i}}(e_{2t}) = e_{1i} \otimes e_{2t} = e_{(i-1)m_2 + t}.$$

Therefore, all entries of $U_{e_{1i}}$ take the value zero except the entries, that take the value 1, at the positions $((i-1)m_2 + t, t)$, where $t \in \{1, ..., m_2\}$.

(ii) Let $(s, t) \in \{1, ..., n_1\} \times \{1, ..., n_2\}$. Using Proposition 3.2(i), we have $$V_{f_{1k}}(f_{1s} \otimes f_{2t}) = \langle f_{1s}, f_{1k} \rangle f_{2t} = \delta_{sk} f_{2t}.$$

Using similar to (4.1), we obtain $f_{1s} \otimes f_{2t} = f_{(s-1)n_2 + t}$, and so $$V_{f_{1k}}(f_{(s-1)n_2 + t}) = \delta_{sk} f_{2t}.$$

Therefore, all entries of $V_{f_{1k}}$ take the value zero except the entries, that take the value 1, at the positions $((k-1)n_2 + t, t)$, where $t \in \{1, ..., m_2\}$.

To prove (iii) and (iv), we use similar to the arguments used to prove (i) and (ii).

□

Theorem 4.2. *Let $M = (x_{b\alpha})_{b=1, \alpha=1}^{n_1 n_2, m_1 m_2}$. Let $(\beta, \alpha) \in \{1, ..., n_1 n_2\} \times \{1, ..., m_1 m_2\}$ and assume that $x_{\beta\alpha} \neq 0$. Let $i \in \{1, ..., m_1\}$, $j \in \{1, ..., m_2\}$, $k \in \{1, ..., n_1\}$, and $l \in \{1, ..., n_2\}$ be such that*

$$\alpha = (i-1)m_2 + j \quad \text{and} \quad \beta = (k-1)n_2 + l.$$

*Then*

$$\text{rank}_\otimes(M - A \otimes B/x_{\beta\alpha}) = \text{rank}_\otimes(M) - 1,$$

*where $A$ and $B$ are two matrices defined as follows.*

*(i) For each integer $b$ between $1$ and $n_1$ and each integer $a$ between $1$ and $m_1$,*

$$A(b, a) = M((b-1)n_2 + l, (a-1)m_2 + j).$$

*(ii) For each integer $b$ between $1$ and $n_2$ and each integer $a$ between $1$ and $m_2$,*

$$B(b, a) = M((k-1)n_2 + b, (i-1)m_2 + a).$$

*Proof.* We have $\langle Me_\alpha, f_\beta \rangle = x_{\beta\alpha} \neq 0$. If $i \in \{1, ..., m_1\}$, $j \in \{1, ..., m_2\}$, $k \in \{1, ..., n_1\}$, and $l \in \{1, ..., n_2\}$ are such that $$\alpha = (i-1)m_2 + j \quad \text{and} \quad \beta = (k-1)n_2 + l,$$

then $$e_\alpha = e_{1i} \otimes e_{2j} \quad \text{and} \quad f_\beta = f_{1k} \otimes f_{2l}.$$

Using Theorem 3.7, we have $$\text{rank}_\otimes(M - V^{f_{2l}}MU^{u_{2j}} \otimes V_{f_{1k}}MU_{u_{1i}}/(Me_\alpha, f_\beta)) = \text{rank}_\otimes(M) - 1.$$

Using the definitions of the matrices $U_{u_{1i}}$, $V_{f_{1k}}$, $U^{u_{2j}}$, and $V^{f_{2l}}$ in Lemma 4.1, it is easy to see that $A = V^{f_{2l}}MU^{u_{2j}}$ is defined by statement (i) and $B = V_{f_{1k}}MU_{u_{1i}}$ is defined by statement (ii). □

Using Theorem 4.2, we build a canonical BSD algorithm as follows. Let $M_1$ be an $n_1 n_1 \times m_1 m_2$ matrix.

Step 1. Select an entry $x_{\beta_1 \alpha_1} \neq 0$ from $M_1$ and let $M_{11} = A$ and $M_{21} = B$, where $A$ and $B$ are as in Theorem 4.2 for $M = M_1$.

If $M_1 - M_{11} \otimes M_{21}/x_{\beta_1 \alpha_1} = 0$, then $\text{rank}_\otimes(M_1) = 1$ and $$M_1 = M_{11} \otimes M_{21}/x_{\beta_1 \alpha_1}$$

is a Schmidt decomposition of $M_1$. Otherwise, let $M_2 = M_1 - M_{11} \otimes M_{21}/x_{\beta_1 \alpha_1}$ and go to next step.

Step h. Select an entry $x_{\beta_h \alpha_h} \neq 0$ from $M_h$ and let $M_{1h} = A$ and $M_{2h} = B$, where $A$ and $B$ are as in Theorem 4.2 for $M = M_h$.

If $M_h - M_{1h} \otimes M_{2h}/x_{\beta_h \alpha_h} = 0$, then $\text{rank}_\otimes(M_1) = h$ and $$M_1 = \sum_{k=1}^{h} M_{1k} \otimes M_{2k}/x_{\beta_k \alpha_k}$$

is a Schmidt decomposition of $M_1$. Otherwise, let $M_{h+1} = M_h - M_{1h} \otimes M_{2h}/x_{\beta_h \alpha_h}$ and go to next Step.

The algorithm stops after $r$ steps if and only if $\text{rank}_\otimes(M_1) = r$. In this case, we say that the Schmidt decomposition of $M_1$ is obtained following the *pattern matrix* $P = [(\beta_k, \alpha_k)]_{k=1}^{r}$. Thus, to find the Schmidt decomposition of $M_1$, we can use one of many canonical BSD algorithms, each of which is determined by its pattern matrix. However, the pattern matrix cannot be defined prior to the algorithm, because at each step the chosen entry must be nonzero. A canonical BSD algorithm can be rather defined by stating how to choose the nonzero entry, e.g., choosing the first nonzero entry at each step.

Corollary 4.3. *Let*

$$M = \sum_{k=1}^{r} M_{1k} \otimes M_{2k}/x_{\beta_k \alpha_k}$$

*be a canonical BSD of $M$. Let $k \in \{1, ..., r\}$. Each entry $x$ of $M_{1k}$ or $M_{2k}$ satisfies the following statement.*

*(1) $x$ is obtained using some entries of $M$ combined using the four elementary operations: $+$, $-$, $\times$, and $\div$.*

*Proof.* We let $M_1 = M$ and we use the notations of the above algorithm.

The entries of $M_{11}$ and $M_{21}$ are extracted from $M_1$, and so each entry of $M_1$, $M_{11}$ or $M_{21}$ satisfies (1). For some $k \in \{1, ..., r-1\}$, assume that each entry of $M_k$, $M_{1k}$ or $M_{2k}$ satisfies (1). In one hand, each entry of $M_{1k} \otimes M_{2k}$ is the product of an entry of $M_{1k}$ and an entry of $M_{2k}$. In the other hand, $M_{k+1} = M_k - M_{1k} \otimes M_{2k}/x_{\beta_k, n_k}$. Therefore, each entry of $M_{k+1}$ satisfies (1), and so, since the entries of $M_{1(k+1)}$ and $M_{2(k+1)}$ are extracted from $M_{k+1}$, each entry of $M_{1(k+1)}$ or $M_{2(k+1)}$ also satisfies (1). □

As a consequence of Corollary 4.3, if each entry of $M$ takes a rational number, then so does each entry of each matrix involved in a canonical BSD of $M$.

Example 4.4. Let's find a canonical BSD of $$M = \begin{pmatrix} 1 & 2 & 3 & 4 & 5 & 6 \\ 7 & 8 & 9 & 10 & 11 & 12 \\ 13 & 14 & 15 & 16 & 17 & 18 \\ 19 & 20 & 21 & 22 & 23 & 24 \\ 25 & 26 & 27 & 28 & 29 & 30 \\ 31 & 32 & 33 & 34 & 35 & 36 \end{pmatrix}$$

with respect to $(3, 2, 2, 3)$.

Using the entry $M(1,1) = 1$, a first term in the decomposition is $M_{11} \otimes M_{21}$, where $$M_{11} = \begin{pmatrix} 1 & 4 \\ 13 & 16 \\ 25 & 28 \end{pmatrix} \quad \text{and} \quad M_{21} = \begin{pmatrix} 1 & 2 & 3 \\ 7 & 8 & 9 \end{pmatrix}.$$

We have $$M - M_{11} \otimes M_{21} = \begin{pmatrix} 0 & 0 & 0 & 0 & -3 & -6 \\ 0 & 0 & 0 & -18 & -21 & -24 \\ 0 & -12 & -24 & 0 & -15 & -30 \\ -72 & -84 & -96 & -90 & -105 & -120 \\ 0 & -24 & -48 & 0 & -27 & -54 \\ -144 & -168 & -192 & -162 & -189 & -216 \end{pmatrix}.$$

From the last matrix, we pick the entry at $(3,2)$ whose value is $-12$. We then obtain a second term $M_{12} \otimes M_{22}$ in the decomposition of $M$, where $$M_{12} = \begin{pmatrix} 0 & -3 \\ -12 & -15 \\ -24 & -27 \end{pmatrix} \quad \text{and} \quad M_{22} = \begin{pmatrix} 0 & -12 & -24 \\ -72 & -84 & -96 \end{pmatrix}.$$

This leads to the canonical BSD $$M = M_{11} \otimes M_{21} + M_{12} \otimes M_{22}/-12$$

whose pattern matrix is $P = \{(1,1), (3,2)\}$.

4.2 Lossless Compression with BSD

For this subsection, $M$ is an $n_1 n_2 \times m_1 m_2$ matrix having the following canonical BSD:

$$M = \sum_{k=1}^{r} M_{1k} \otimes M_{2k}/x_{\beta_k \alpha_k}, \qquad (4.2)$$

where, for each $k \in \{1,...,r\}$, $M_{1k}$ is an $n_1 \times m_1$ matrix and $M_{2k}$ is an $n_2 \times m_2$ matrix. We assume that $P = [(\beta_k, \alpha_k)]_{k=1}^{r}$ is the pattern matrix of this decomposition. For each $h \in \{1,...,r\}$, we define the $n_1 n_2 \times m_1 m_2$ matrix $$M_h = \sum_{k=h}^{r} M_{1k} \otimes M_{2k}.$$

Hence, for each $h \in \{1,...,r\}$, the entries of $M_{1h}$ and $M_{2h}$ are extracted from $M_h$.

Definition 4.5. (i) For each $h \in \{1,...,r\}$, $A_{1h}$ denotes an $n_1 \times m_1$ matrix whose entries are the entries of $M$ positioned at the positions of the entries of $M_{1h}$ in $M_h$; and $A_{2h}$ denotes an $n_2 \times m_2$ matrix whose entries are the entries of $M$ positioned at the positions of $M_{2h}$ in $M_h$.

(ii) An entry of $M$ that is used in building the matrices $A_{11}, A_{21},...A_{1r}, A_{2r}$ is called an *essential entry* and its position in $M$ is called an *essential position*.

(iii) An *essential matrix* of $M$ is an $n_1 n_2 \times m_1 m_2$ matrix $E$, for which the entries at the essential positions of $M$ coincide with the essential entries of $M$. The matrix $E$ can take any value at a position that is not an essential position of $M$.

(iv) Starting with $h = 1$ and finishing with $h = r$, we store in a sequence $S$ row after row the entries of $A_{1h}$ followed by row after row the entries of $A_{2h}$ excluding any entry of $M$ that is previously stored in $S$. We call $S$, the *essential sequence* of $M$.

Lemma 4.6. *Following $P$, the sum of the first $r$ terms in a canonical BSD of $E$ provides the canonical BSD of $M$ following $P$.*

*Proof.* First, notice $x_{\beta \alpha}$ is an essential entry of $M$ if $(\beta, \alpha)$ is a row in $P$.

If $(\beta_1, \alpha_1)$ is used to extract the first term $E_{11} \otimes E_{21}/x_{\beta_1 \alpha_1}$ in the decomposition of $E$, then $E_{11} = M_{11}$ and $E_{21} = M_{21}$, and so the matrices $M_2 = M - M_{11} \otimes M_{21}/x_{\beta_1 \alpha_1}$ and $E_2 = E - E_{11} \otimes E_{21}/x_{\beta_1 \alpha_1}$ coincide at the essential positions of $M$. Thus, if $(\beta_2, \alpha_2)$ is used to extract the second term $E_{12} \otimes E_{22}/x_{\beta_2 \alpha_2}$ in the decomposition of $E$, then $E_{12} = M_{12}$ and $E_{22} = M_{22}$, and so the matrices $M_3 = M_2 - M_{21} \otimes M_{22}/x_{\beta_2 \alpha_2}$ and $E_3 = E_2 - E_{12} \otimes E_{22}/x_{\beta_2 \alpha_2}$ coincide at the essential positions of $M$. We keep this process until we reach $E_{1r} = M_{1r}$ and $E_{2r} = M_{2r}$. □

Proposition 4.7. *(i) The matrix $M$ can be recovered using the matrices $A_{11}$, $A_{21}$, ..., $A_{1r}$, $A_{2r}$ and the pattern matrix $P$.*

*(ii) Using the fact that $M$ is decomposed with respect to $(n_1, n_2, m_1, m_2)$, the matrix $M$ can be recovered using the essential sequence $S$ and the pattern matrix $P$.*

*(iii) The number of entries of $S$ is less or equal to $r(m_1 n_1 + m_2 n_2 - 1)$.*

*(iv) The values of the entries of the matrices $A_{11}$, $A_{21}$, ..., $A_{1r}$, $A_{2r}$ as well as the values of the terms of $S$ are in the class of the values of the entries of $M$.*

*Proof.* (i) Given $A_{11}, A_{21}, ..., A_{1r}, A_{2r}$, and the pattern matrix $P$, we build an $n_1 n_2 \times m_1 m_2$ matrix $E$ as follows.

Let $h \in \{1, ..., r\}$. Performing the Euclidean division of $\alpha_h$ by $m_2$ and $\beta_h$ by $n_2$, we find $i \in \{1, ..., m_1\}$, $j \in \{1, ..., m_2\}$, $k \in \{1, ..., n_1\}$, and $l \in \{1, ..., n_2\}$ satisfying the equalities $$\alpha_h = (i-1)m_2 + j \quad \text{and} \quad \beta_h = (k-1)n_2 + l. \tag{4.3}$$

We define $$E((b-1)n_2 + l, (a-1)m_2 + j) = A_{1h}(b, a) \tag{4.4}$$

for each $b$ between 1 and $n_1$ and each $a$ between 1 and $m_1$, and $$E((k-1)n_2 + b, (i-1)m_2 + a) = A_{2h}(b, a), \tag{4.5}$$

for each $b$ between 1 and $n_2$ and each $a$ between 1 and $m_2$. An entry of $E$ that is not defined by (4.4) nor (4.5) can take an arbitrary value. Looking at definition 4.5, we conclude that $E$ is an essential matrix of $M$, and so, by Lemma 4.6, $M$ is the sum of the first $r$ terms of a BSD of $E$ following $P$.

(ii) Assume that $(n_1, n_2, m_1, m_2)$, the sequence $S$, and the matrix $P$ are given. To build $E$, we shall use the pigeonhole principle and the stereographic order, i.e., we start with the successive positions of the first row, we then follow with the successive positions of the second row, and so on, to fill the $n_1 n_2 \times m_1 m_2$ matrix $E$ with the terms of $S$.

Step 1 Let $i, j, k$, and $l$ be defined by (4.3) for $h = 1$.

1. Using the first $n_1 m_1$ terms of $S$, we fill $E$ at the positions $$\{((b-1)n_2 + l, (a-1)m_2 + j) : (a, b) \in \{1, ..., m_1\} \times \{1, ..., n_1\}\}.$$

2. Using some of the first $n_2 m_2$ terms that come after the first $n_1 m_1$ terms of $S$, we fill $E$ at the positions $$\{((k-1)n_2 + b, (i-1)m_2 + a) : (a, b) \in \{1, ..., m_2\} \times \{1, ..., n_2\}\}$$

that are unfilled. Let $s_1$ be equal to the first $s_1$ terms of $S$ used in Step 1.

Assume Steps 1 to h-1 are performed for some h between 1 and $r-1$

Step h Let $i, j, k$, and $l$ be defined by (4.3).

1. Using some of the first $n_1 m_1$ terms that come after the first $s_{k-1}$ terms of $S$, we fill $E$ at the positions $$\{((b-1)n_2 + l, (a-1)m_2 + j) : (a,b) \in \{1, ..., m_1\} \times \{1, ..., n_1\}\}$$

that are unfilled. Let $t$ be equal to the first $t$ terms of $S$ used until the first part of Step h.

2. Using some of the first $n_2 m_2$ terms that come after the first $t$ terms of $S$, we fill $E$ at the positions $$\{((k-1)n_2 + b, (i-1)m_2 + a) : (a,b) \in \{1, ..., m_2\} \times \{1, ..., n_2\}\}$$

that are unfilled. Let $s_k$ be equal to the first $s_k$ terms of $S$ are used until Step h.

The process stops after a maximum of $r$ steps. After that, any unfilled position of $E$ can be filled with an arbitrary value.

It is clear that $E$ is an essential matrix of $M$, and so, by Lemma 4.6, $M$ is the sum of the first $r$ terms of a BSD of $E$ following $P$.

(iii) Together the matrices $A_{11}, A_{21}, ..., A_{1h}, A_{2h}$ have a total number of entries equals to $r(m_1 n_1 + m_2 n_2)$. Looking at (4.4) and (4.5), $$\forall h \in \{1, ..., r\}, \quad A_{1h}(k, i) = A_{2h}(l, j),$$

where $i, j, k$, and $l$ are defined by (4.3). Therefore, the number of entries of $S$ is less or equal than $r(m_1 n_1 + m_2 n_2 - 1)$.

Statement (iv) is obvious, since the entries of the matrices $A_{11}, A_{21}, ..., A_{1r}, A_{2r}$ as well as the terms of $S$ are extracted from $M$. □

In the followings, we state for each of the methods SVD, SSVD, BSD(i), and BSD(ii) the number of entries needed to recover an $n_1 n_2 \times m_1 m_2$ matrix $M$ whose entries are in a certain class of integers. We assume that $\text{rank}(M) = R$ and $\text{rank}_\otimes(M) = r$.

1. With SVD, we need $R(n_1 m_1 + n_2 m_2 + 1)$ entries to recover $M$, where $R \leq \min(n_1 m_1 + n_2 m_2)$. These entries are real numbers.

2. With SSVD, we need $r(n_1 n_2 + m_1 m_2)$ entries to recover $M$, where $r \leq \min(n_1 n_2, m_1 m_2)$. These entries are real numbers.

3. With BSD(i), we need $r(n_1 n_2 + m_1 m_2 + 2)$ entries to recover $M$, where $r \leq \min(n_1 n_2, m_1 m_2)$. These entries are all integers and $r(n_1 n_2 + m_1 m_2)$ of them are in the class of the entries of $M$.

4. With BSD(ii), using the fact that $S$ cannot have more than $n_1 n_2 m_1 m_2$ terms, we need less than $\min(r(n_1 n_2 + m_1 m_2 + 1) + 4, n_1 n_2 m_1 m_2 + r + 4)$ entries to recover $M$, where $r \leq \min(n_1 n_2, m_1 m_2)$. These entries are all integers and $r(n_1 n_2 + m_1 m_2 - 1)$ of them are in the class of the entries of $M$.

Example 4.8. (a) Following Example 4.3, we have $$A_{11} = \begin{pmatrix} 1 & 4 \\ 13 & 16 \\ 25 & 28 \end{pmatrix}, \quad A_{21} = \begin{pmatrix} 1 & 2 & 3 \\ 7 & 8 & 9 \end{pmatrix},$$

$$A_{12} = \begin{pmatrix} 2 & 5 \\ 14 & 17 \\ 26 & 29 \end{pmatrix} \text{ and } A_{22} = \begin{pmatrix} 13 & 14 & 15 \\ 19 & 20 & 21 \end{pmatrix}.$$

The parameters $(3,2,2,3)$, the pattern matrix $P = [(1,1), (3,2)]$, and the essential sequence $S = (1, 4, 13, 16, 25, 28, 2, 3, 7, 8, 9, 5, 14, 17, 26, 29, 15, 19, 20, 21)$ are what we need to recover $M$.

We first build the $6 \times 6$ essential matrix $E$.

Step 1 The first row of $P$ is $(1,1)$.

1. The positions to first fill in $E$ are $(1,1), (1,4), (3,1), (3,4), (5,1), (5,4)$, in which we store the entries $1, 4, 13, , 16, 25, 28$.

2. The positions to second fill in $E$ are $(1,2), (1,3), (2,1), (2,2), (2,2)$, in which we store the entries $2, 3, 7, 8, 9$. Notice that the pigeonhole principle eliminates the position $(1,1)$ that is already filled.

Step 2 The second row of $P$ is $(3,2)$.

1. The positions to third fill in $E$ are $(1,5), (3,2), (3,5), (5,2), (5,5)$, in which we store the entries $5, 14, 17, 26, 29$. Notice that the pigeonhole principle eliminates the position $(1,3)$ that is already filled.

2. The positions to fourth fill in $E$ are $(3,3), (4,1), (4,2), (4,3)$, in which we store the entries $15, 19, 20, 21$. Notice that the pigeonhole principle eliminates the position $(3,1)$ and $(3,2)$ that are already filled.

Thus, we obtain $$E = \begin{pmatrix} 1 & 2 & 3 & 4 & 5 & . \\ 7 & 8 & 9 & . & . & . \\ 13 & 14 & 15 & 16 & 17 & . \\ 19 & 20 & 21 & . & . & . \\ 25 & 26 & . & 28 & 29 & . \\ . & . & . & . & . & . \end{pmatrix}$$

filling the empty entries with arbitrary values and decomposing E following P, we obtain M.

Therefore, the compression of M is of 28 entries whose values are integers between 1 and 36.

(b) Using SVD, we find the Schmidt decomposition $$M = N_{11} \otimes N_{21} + N_{12} \otimes N_{22},$$

where, $$N_{11} \simeq \begin{pmatrix} -13.1341 & -20.4201 \\ -42.2782 & -49.5642 \\ -71.4223 & -78.7083 \end{pmatrix}, \quad N_{21} \simeq \begin{pmatrix} -0.3365 & -0.3535 & -0.3706 \\ -0.4389 & -0.4560 & -0.4731 \end{pmatrix},$$

$$N_{12} \simeq \begin{pmatrix} -5.9578 & -5.0018 \\ -2.1338 & -1.1778 \\ 1.6901 & 2.6461 \end{pmatrix} \text{ and } N_{22} \simeq \begin{pmatrix} 0.5739 & 0.4437 & 0.3135 \\ -0.2073 & -0.3375 & -0.4677 \end{pmatrix}.$$

We conclude that the compression of M includes 24 real numbers that are not integers and probably irrational.

(c) The SVD of M leads to the singular values approximately equal to 127.2064 and 4.9526 and the singular vectors which are approximatively the columns of the following matrix:

$$\begin{pmatrix} -0.0695 & -0.7204 & -0.3651 & 0.6249 \\ -0.1848 & -0.5110 & -0.3819 & 0.3865 \\ -0.3000 & -0.3015 & -0.3988 & 0.1480 \\ -0.4153 & -0.0921 & -0.4157 & -0.0904 \\ -0.5305 & 0.1173 & -0.4325 & -0.3289 \\ -0.6458 & 0.3268 & -0.4494 & -0.5673 \end{pmatrix}.$$

We conclude that the compression of M includes 26 real numbers that are not integers and probably irrational.

(d) In the following table, we summarize the results for each compression. The error is the Frobenius norm of the difference between M and the output of the decompression computed using MATLAB.

| Compression | Entries | Class | Error |
|---|---|---|---|
| BSD | 28 | Same as M | 0 |
| SSVD | 24 | Real numbers | $9.1339 \cdot 10^{-014}$ |
| SVD | 26 | Real numbers | $4.1440 \cdot 10^{-014}$ |

An integer between 0 and 255 requires 1 byte to be stored in a computer. Thus, M requires 36 bytes to be stored, while the compressed file with BSD requires 28 bytes, and so a lossless compression is achieved.

MATLAB yields nonzero errors for SSVD and SVD. This means that using 4 bytes to store each entry of the compressed file with SSVD or SVD is not enough to exactly recover $M$. Thus, to recover $M$ we need more than 96 bytes with SSVD and more than 104 bytes with SVD. Therefore, no lossless compression is achieved.

In [6], the author introduces a lossy compression method based on BSD hybridized with SSVD. Applied to an image, the compression ratio with the new method is much higher than the compression ratio with SVD or SSVD, while the decompression outputs have the same quality. In some cases where the image is from standard test images, it was also noticed that the compression ratio with the new method are more than twice the compression ratio with JPEG. The author has submitted a patent application [7] that protect both the lossless compression with BSD and the lossy compression with methods based on BSD hybridized with SSVD.

An example of a computer system which can be used to carry out algorithms described herein is shown and described with respect to FIG. 4, below. Any portion or all of the algorithms can be carried out on one computer, or a digital file or digital data stream to be compressed can be uploaded to a remote server on a LAN or WAN, including a server on the internet. Portions of the algorithms or embodiments herein can be carried out by different computers in the same location, or by computers in different locations. In either case, steps in an algorithm can be carried out by parallel processing, or multiple computers can each execute subroutines of a given algorithm or embodiment.

Using any of the foregoing methods, a server can execute the algorithms of the disclosure upon the digital file or stream provided, which can be an image file, audio file, video file, data file, or any other data source, including streamed data. Once the digital data is compressed, it can be stored in a remote location for later retrieval or forwarding, or can be returned to the address from which the digital file or stream was originally obtained.

Additionally, the compressed file can be sent to an output device, for example a display, printer (including a 3D printer), audio and/or video output device, or any other known or hereinafter developed output device. When a data file or stream has been compressed and/or encrypted in accordance with the disclosure and is returned to the original source, it can then be more efficiently stored at the source, or redistributed to multiple recipients, where significant savings in cost and speed can be realized because the resulting digital file or stream requires substantially fewer bytes for storage and transmission.

Example Computer System

Figure 4:
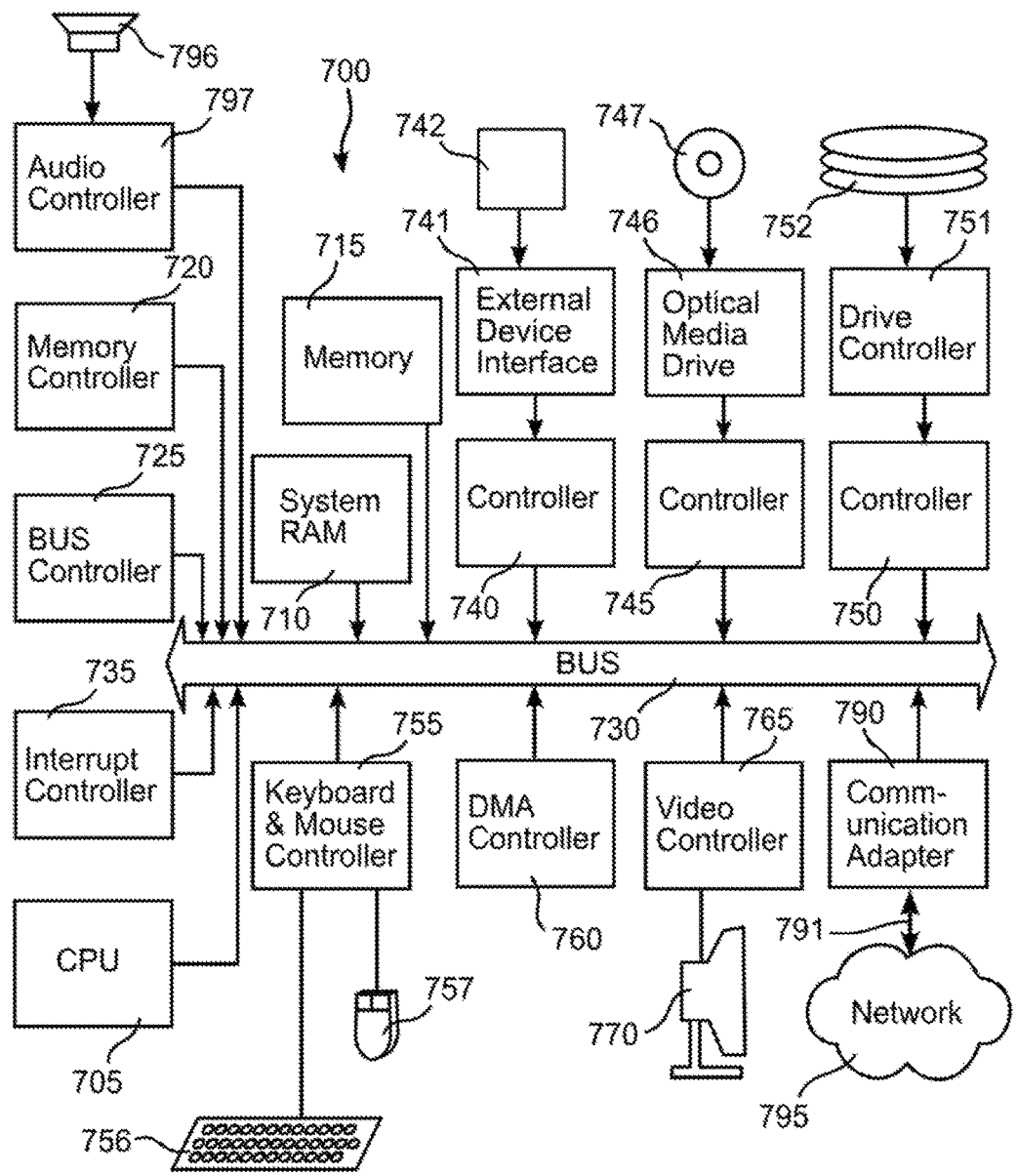
FIG. 4 depicts computing equipment, part or all of which can be used to carry out the disclosure.

FIG. 4 illustrates the system architecture for a computer system 700, such as a general purpose computer, or a series of interconnected computers, or a computer containing a plurality of processors, on which or with which the disclosure may be implemented. The exemplary computer system of FIG. 4 is for descriptive purposes only. Although the description may refer to terms commonly used in describing particular computer systems, the description and concepts equally apply to other systems, including systems having architectures dissimilar to FIG. 4. Computer system 700 executes software stored on non-transitory media, the software configured to received inputs from other computing devices or from human interface devices.

Computer system 700 includes at least one central processing unit (CPU) 705, or server, which may be implemented with a conventional microprocessor, a random access memory (RAM) 710 for temporary storage of information, and a read only memory (ROM) 715 for permanent storage of information. A memory controller 720 is provided for controlling RAM 710.

A bus 730 interconnects the components of computer system 700. A bus controller 725 is provided for controlling bus 730. An interrupt controller 735 is used for receiving and processing various interrupt signals from the system components.

Mass storage may be provided by DVD ROM 747, or flash or rotating hard disk drive 752, for example. Data and software, including software 400 of the disclosure, may be exchanged with computer system 700 via removable media such as diskette, CD ROM, DVD, Blu Ray, or other optical media 747 connectable to an Optical Media Drive 746 and Controller 745. Alternatively, other media, including for example a media stick, for example a solid state USB drive, may be connected to an External Device Interface 741, and Controller 740. Additionally, another computing device can be connected to computer system 700 through External Device Interface 741, for example by a USB connector, BLUETOOTH connector, Infrared, or WiFi connector, although other modes of connection are known or may be hereinafter developed. A hard disk 752 is part of a fixed disk drive 751 which is connected to bus 730 by controller 750. It should be understood that other storage, peripheral, and computer processing means may be developed in the future, which may advantageously be used with the disclosure.

User input to computer system 700 may be provided by a number of devices. For example, a keyboard 756 and mouse 757 are connected to bus 730 by controller 755. An audio transducer 796, which may act as both a microphone and a speaker, is connected to bus 730 by audio controller 797, as illustrated. It will be obvious to those reasonably skilled in the art that other input devices, such as a pen and/or tablet, Personal Digital Assistant (PDA), mobile/cellular phone and other devices, may be connected to bus 730 and an appropriate controller and software, as required. DMA controller 760 is provided for performing direct memory access to RAM 710. A visual display is generated by video controller 765 which controls video display 770. Computer system 700 also includes a communications adapter 790 which allows the system to be interconnected to a local area network (LAN) or a wide area network (WAN), schematically illustrated by bus 791 and network 795.

Operation of computer system 700 is generally controlled and coordinated by operating system software, such as a Windows system, commercially available from Microsoft Corp., Redmond, Wash. The operating system controls allocation of system resources and performs tasks such as processing scheduling, memory management, networking, and I/O services, among other things. In particular, an operating system resident in system memory and running on CPU 705 coordinates the operation of the other elements of computer system 700. The present disclosure may be implemented with any number of commercially available operating systems.

One or more applications, such as an HTML page server, or a commercially available communication application, may execute under the control of the operating system, operable to convey information to a user.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

REFERENCES

[1] Abdelkrim Bourouihiya, The tensor Product of Frames, Sampling theory in signal and Image processing, Vol. 7, No. 1 (2008), pp. 65-76.

[1A] H. Cheng, Z. Gimbutas, P.-G. Martinsson, V. Rokhlin, On the compression of low rank matrices, SIAM J. Sci. Comput., 26 (2005), pp. 1389-1404.

[2] G. Eckart, G. Young, The approximation of one matrix by another of lower rank, Psychometrika, 1, 1936, pp. 211-218.

[3] Horn, Roger A.; Johnson, Charles R., Topics in Matrix Analysis, 1991, *Cambridge University Press.*

[4] Satish K. Singh, and Shishir Kumar. Mathematical transforms and image compression: A review. Maejo Int. J. Sci. Technol. 2010, 4(02), 235-249.

[5] S. O. Aase, J. H. Husoy and P. Waldemar, A critique of SVD-based image coding systems. IEEE International Symposium on Circuits and Systems on VLSI 1999, Vol. 4, Orlando, Fla., USA, pp. 13-16.

[6] B. Arnold and A. McInnes. An investigation into using singular value decomposition as a method of image compression. College of Redwood, University of Canterbury, New Zealand. Technical Report (2000).

[7] H. C. Andrews and C. L. Paterson, Singular value decomposition (SVD) image coding. IEEE Trans. Comm 1976, 24, 425-432.

[7a] G. H. Golub and C. Reinsels, Singular value decomposition and least square solutions, Numer.Math., 1970, 14, 403-420. 1976, 24, 425-432.

[8] V. Singh, Recent Patents on Image Compression—A Survey http://www.benthamscience.com/open/rptsp/articles/V002/47RPTSP.pdf

[9] Julie Kamm and James G. Nagy, kronecker product and SVD approximations in image restoration, Linear Algebra and its Applications 284, (1998), 177-192

[10] Jain, Anil K. (1989), Fundamentals of Digital Image Processing, *Prentice Hall.*

[11] Kadison, Richard V.; Ringrose, John R. (1997), Fundamentals of the theory of operator algebras. Vol. I, Graduate Studies in Mathematics 15, Providence, R.I.: *American Mathematical Society.*

[12] Steeb, Willi-Hans, Matrix Calculus and Kronecker Product with Applications and C++ Programs, 1997, *World Scientific Publishing.*

[12a] Steeb, Willi-Hans, Matrix Calculus and Kronecker Product with Applications, 2011, *World Scientific Publishing.*

What is claimed is:

1. A method for encoding digital data, comprising:
using a computer executing software stored on non-transitory media, the software configured to:
use SVD to find Ma, an mn×pq matrix, with the lowest Schmidt rank R for which PSNR(Ma,M)≥a predetermined value;
quantize Ma to find a matrix Q whose entries are integers;
define a left essential matrix A;
define a right essential matrix B;
define a pattern matrix P for storing positions of essential entries;
assign to matrix $M_e$ a starting value of Q;
define a matrix $A_e$;
define a matrix $B_e$;
assign a starting value to e;
a) select a non-zero entry $d_e$ of $M_e$;
b) store the position (r, c) of the selected non-zero entry of $M_e$ at an $e^{th}$ column of P;
c) select from $M_e$ two matrices $A_e$ and $B_e$ having $d_e$ as a common entry and for which $A_e \otimes B_e/d_e$ is a term in the Schmidt decomposition of M with respect to the parameters m, n, p, and q;
d) store in the $e^{th}$ m×p block of A the entries of M whose positions are the positions of the entries of $A_e$ in $M_e$;
e) store in the $e^{th}$ n×q block of B the entries of M whose positions are the positions of the entries of $B_e$ in $M_e$; and
f) calculate the matrix $M_{e+1}=M_e-A_e \otimes B_e/d_e$, and if e<R, repeat steps (a)-(f) with $M_{e+1}$, and e=R, then P, A, and B collectively represent encoded digital data corresponding to M; and
g) transfer the encoded data to digital storage on at least one of the computer executing software or another computer, the encoded data comprising fewer data bytes than the source digital data, and representing at least one of all the information in the source digital data, and an approximation of all of the information in the source digital data.

2. The method of claim 1, wherein the pattern matrix P is replaced by a sequence of block positions in which the entries of each block matrix are essential entries.

\* \* \* \* \*